United States Patent
Inagaki et al.

[11] Patent Number: 5,742,264
[45] Date of Patent: Apr. 21, 1998

[54] HEAD-MOUNTED DISPLAY

[75] Inventors: Satoru Inagaki, Suita; Yoshihisa Nishigori, Ikeda, both of Japan

[73] Assignee: Matsushita Electric Industrial Co., Ltd., Osaka, Japan

[21] Appl. No.: 589,959

[22] Filed: Jan. 23, 1996

[30] Foreign Application Priority Data

Jan. 24, 1995 [JP] Japan .................................. 7-028745
Feb. 24, 1995 [JP] Japan .................................. 7-036828

[51] Int. Cl.$^6$ .................................................. G09G 3/02
[52] U.S. Cl. .................................. 345/8; 345/7; 345/9
[58] Field of Search .................................. 345/8, 7, 9

[56] References Cited

U.S. PATENT DOCUMENTS

| | | | |
|---|---|---|---|
| 4,755,023 | 7/1988 | Evans et al. | 350/174 |
| 4,884,219 | 11/1989 | Waldren | 364/514 |
| 4,961,626 | 10/1990 | Fournier, Jr. et al. | 350/174 |
| 4,969,714 | 11/1990 | Fournier, Jr. et al. | 353/174 |
| 5,309,169 | 5/1994 | Lippert | 345/8 |
| 5,320,538 | 6/1994 | Baum | 434/307 |
| 5,486,841 | 1/1996 | Hara et al. | 345/8 |
| 5,572,343 | 11/1996 | Okamura et al. | 359/53 |
| 5,576,887 | 11/1996 | Ferrin et al. | 359/631 |
| 5,581,271 | 12/1996 | Kraemer | 345/8 |

FOREIGN PATENT DOCUMENTS

| | | |
|---|---|---|
| 02301798 | 12/1990 | Japan . |
| 04208996 | 7/1992 | Japan . |

*Primary Examiner*—Mark R. Powell
*Assistant Examiner*—Vincent E. Kovalick
*Attorney, Agent, or Firm*—Ratner & Prestia

[57] ABSTRACT

A head-mounted display for displaying an image that matches a viewer's head movement has a head tracker for detecting the viewer's head movement, an eye tracker for detecting the viewer's eye movement, and an adaptive filter for adaptively filtering the output of the head tracker in accordance with the output of the head tracker and the output of the eye tracker, and when tracker, and when the viewer is watching a particular object in the displayed image, the adaptive filter is set as a low-pass filter, and this and the output gain of the head tracker is lowered; in other cases, the adaptive filter is set as an all-pass filter, and this prevents minute shaking of the head from being reflected on the displayed image, while retaining image display response to head motion, and furthermore, this serves to keep the particular object from being shifted outside the field of view.

31 Claims, 24 Drawing Sheets

|  | ← HEAD MOVEMENT → + |  |  |
|---|---|---|---|
| EYE MOVEMENT − ↑ ↓ + | THROUGH | LOW PASS | LOW PASS |
| | THROUGH | LOW PASS | THROUGH |
| | LOW PASS | LOW PASS | THROUGH |

FIG. 4

| | - ← | VELOCITY | → + |
|---|---|---|---|
| ACCELERATION ↑ - | SMALL | MEDIUM | SMALL |
| | MEDIUM | BIG | MEDIUM |
| ↓ + | SMALL | MEDIUM | SMALL |

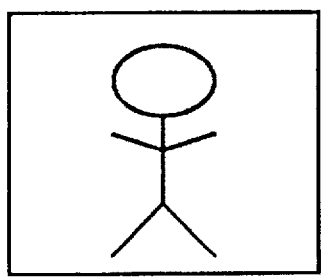 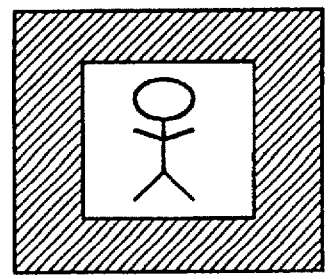
FIG. 18A   FIG. 18B
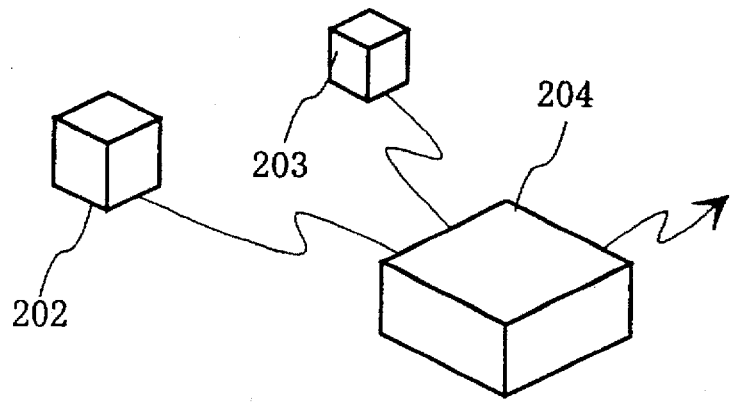
FIG. 20
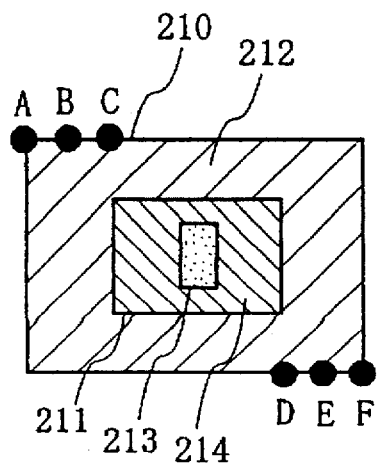
FIG. 21

HEAD-MOUNTED DISPLAY

BACKGROUND OF THE INVENTION

1. Field of the Invention

The present invention relates to a head-mounted display.

2. Description of the Related Art

In a conventional head-mounted display used in a virtual reality (VR) system, the displayed image is controlled in accordance with information representing movement of the viewer's head. Among prior art see-through type head-mounted displays is the "Visual Information Transmission Apparatus" disclosed in Japanese Patent Unexamined Publication No. 4-208996. In this apparatus, an image is projected onto a half-silvered mirror for display with the view of the real world overlaid thereon. This apparatus, however, has had the shortcoming that, when creating a computer graphics image or displaying an image to match the head position, if noise or head shaking occurs during the measurement of the head position, such electrical or mechanical noise is reflected on the displayed image and causes minute shaking of the image being viewed, magnifying the unnaturalness of viewing. Furthermore, if position information is processed using a low-pass filter when measuring the head position, minute shaking of the displayed image can be suppressed, but this in turn causes a perceptible lag in displaying the image when the head moves or comes to rest. This also results in unnaturalness.

An example of a prior art head-mounted display designed to minimize such lag is the "Image Display Apparatus" disclosed in Japanese Patent Unexamined Application No. 2-301798.

In this example, movement of the viewer's head is predicted using information on his eyeball movements, and a CG image is created based on this prediction, to reduce the image display lag involved in the head position measurement and CG image creation.

In this type of prior art head-mounted display, when the head position is predicted successfully, the lag due to the head position measurement and CG image creation can be reduced, which serves to reduce the unnaturalness. On the other hand, when the prediction misses, the error is magnified and the unnaturalness of the displayed image increases. This has been a problem with the prior art head-mounted display.

Another problems occurs when a CG image is created by relying only on the amount of head movement without considering the viewer's viewpoint; that is, since the head-mounted display has a limited field of view, if the viewer rotates his head while keeping his eyes on a particular object in the displayed image, the object he is looking at may move outside the field of view.

SUMMARY OF THE INVENTION

It is an object of the invention to provide a head-mounted display wherein unnaturalness and discomfort of viewing is reduced.

It is another object of the invention to provide a see-through type head-mounted display capable of displaying an image from an image output device properly overlaid on the outside world.

A head-mounted display of the present invention (claim 1)for displaying an image on a display while controlling a viewing angle of the image and a moving speed of an entire image on the basis of a viewer's head position, head orientation, and line-of-sight direction, comprises:

head detecting means for detecting the viewer's head position and head orientation, and for outputting the result of the detection as a head information signal;

line-of-sight detecting means for detecting the viewer's line-of-sight direction, and for outputting the result of the detection as a line-of-sight information signal; and image generating means for generating an image by using said head information signal and said line-of-sight information signal.

A head-mounted display of the present invention (claim 2) for displaying an image on a display while controlling a viewing angle of the image and a moving speed of an entire image on the basis of a viewer's head position, head orientation, and line-of-sight direction, comprises:

head detecting means for detecting the viewer's head position and head orientation, and for outputting the result of the detection as a first head information signal;

line-of-sight detecting means for detecting the viewer's line-of-sight direction, and for outputting the result of the detection as a line-of-sight information signal;

filter control means for calculating an amount of head movement and an amount of line-of-sight movement from a first head information signal output from said head detecting means and the line-of-sight information signal output from said line-of-sight detecting means, and for generating from said amount of head movement and said amount of line-of-sight movement a filter control signal for controlling a pass band;

variable filter means, whose filter characteristic is controlled by said filter control signal, for outputting the result of the control as a second head information; and image generating means for generating an image by using the second head information signal output from said variable filter means and the line-of-sight information signal output from said line-of-sight detecting means.

A head-mounted display of the present invention (claim 5) for displaying an image on a display while controlling a viewing angle of the image and a moving speed of an entire image on the basis of a viewer's head position, head orientation, and line-of-sight direction, comprises:

head detecting means for detecting the viewer's head position and head orientation, and for outputting the result of the detection as a first head information signal;

filter control means for calculating at least a first derivative of the head position or head orientation with respect to unit time from the first head information signal output from said head detecting means, and for generating a filter control signal to provide a low-pass characteristic when said first derivative is smaller than a prescribed value and an all-pass characteristic when said first derivative is not smaller than the prescribed value;

variable filter means, whose filter characteristic is controlled by said filter control signal, for outputting a second head information signal; and image generating means for generating an image by using the second head information signal output from said variable filter means.

A head-mounted display of the present invention (claim 8) for displaying an image on a display while controlling a viewing angle of the image and a moving speed of an entire image on the basis of a viewer's head position, head orientation, and line-of-sight direction, comprises:

head detecting means for detecting the viewer's head position and head orientation, and for outputting the result of the detection as a first head information signal;

line-of-sight detecting means for detecting the viewer's line-of-sight direction, and for outputting the result of the detection as a line-of-sight information signal;

threshold output means for accepting at an input thereof the line-of-sight information signal output from said line-of-sight detecting means, and for outputting a small threshold when an amount of line-of-sight movement is equal to or greater than a prescribed value and a large threshold when said amount is smaller than the prescribed value;

second head information generating means for judging whether to proceed to generate an image or stop the image, by comparing the threshold output from said threshold output means with said first head information signal, and for outputting the result of the judgement as a second head information signal; and image generating means for generating an image by using said second head information signal and the line-of-sight information signal output from said line-of-sight detecting means.

A head-mounted display of the present invention (claim 9) for displaying an image on a display while controlling a viewing angle of the image and a moving speed of an entire image on the basis of a viewer's head position, head orientation, and line-of-sight direction, comprises:

head detecting means for detecting the viewer's head position and head orientation, and for outputting the result of the detection as a first head information signal;

threshold output means for accepting at an input thereof the output of said head detecting means, and for outputting a small threshold when at least a head moving speed or head rotation speed is equal to or greater than a prescribed value and a large threshold when said speed is smaller than the prescribed value;

second head information generating means for judging whether to proceed to generate an image or stop the image, by comparing the threshold output from said threshold output means with said first head information signal, and for outputting the result of the judgement as a second head information signal; and image generating means for generating an image by using said second head information signal.

A head-mounted display of the present invention (claim 11) for displaying an image on a display while controlling a viewing angle of the image and a moving speed of an entire image on the basis of a viewer's head position, head orientation, and line-of-sight direction, comprises:

head detecting means for detecting the viewer's head position and head orientation, and for outputting the result of the detection as a first head information signal;

line-of-sight detecting means for detecting the viewer's line-of-sight direction, and for outputting the result of the detection as a line-of-sight information signal;

moving amount control means for accepting said first head information signal and said line-of-sight information signal, and for outputting a moving amount control signal;

moving amount translating means for translating said first head information signal in accordance with said moving amount control signal, and for outputting a second head information signal; and image generating means for generating an image on the basis of said second head information signal.

A head-mounted display of the present invention (claim 12) for displaying an image on a display while controlling a viewing angle of the image and a moving speed of an entire image on the basis of a viewer's head position, head orientation, and line-of-sight direction, comprises:

head detecting means for detecting the viewer's head position and head orientation, and for outputting the result of the detection as a first head information signal;

line-of-sight detecting means for detecting the viewer's line-of-sight direction, and for outputting the result of the detection as a line-of-sight information signal;

moving amount control means for accepting said first head information signal and said line-of-sight information signal, and for outputting a moving amount control signal;

moving amount translating means for translating said first head information signal in accordance with said moving amount control signal, and for outputting a second head information signal;

error compensating means for accepting said first head information signal, said second head information signal, and said moving amount control signal, errors between said second head information signal and said first head information signal being accumulated as error signals, and for generating an error compensating signal based on accumulated values of said error signals; and image generating means for generating an image by reference to said line-of-sight information signal such that, when the line of sight is not fixed and when the head is moving, the image is generated by adding said error compensating signal to said second head information signal, and when the line of sight is fixed or when the head is not moving, the image is generated without performing the addition but by using said second head information signal.

A see-through type head-mounted display of the present invention (claim 15) for viewing outside light and a displayed image in overlaid fashion with a position of the displayed image being changed to match head movement, comprising:

video signal input means for inputting a video signal;

magnification control means for outputting a display magnification signal for controlling an image display magnification;

a head detection sensor for detecting a viewer's head position and head orientation, and for outputting the same as a first head information signal;

image control means for controlling the image display magnification and image display position on the basis of said first head information signal and said display magnification signal;

display means for displaying an image output from said image control means;

a projection lens for projecting the image of said display means in a designated size; and a mirror having prescribed transmissivity such that the image projected by said projection lens is reflected into the viewer's field of view, while, at the same time, allowing the outside light to enter the viewer's eyes.

A see-through type head-mounted display of the present invention (claim 19) in which a displayed image position is changed to match head movement, comprises:

video signal input means for inputting a video signal;

magnification control means for outputting a display magnification signal for controlling an image display magnification;

a head detection sensor for detecting a viewer's head position and head orientation, and for outputting the same as a first head information signal;

line-of-sight detecting means for detecting the viewer's line-of-sight direction, and for outputting the result of the detection as a line-of-sight information signal; image control means for calculating the image display magnification and image display position on the basis of said first head information signal and said display magnification signal, and for outputting the same as an image control signal;

display means for displaying the input image in accordance with said image control signal;

a projection lens for projecting the image of said display means in a designated size; and a reflective/transmissive panel constructed from a transparent panel and a liquid-crystal panel attached back-to-back, said liquid-crystal panel being driven in accordance with said image control signal.

A see-through type head-mounted display of the present invention (claim 23) for viewing outside light and a displayed image in overlaid fashion with a position of the displayed image being changed to match head movement, comprises:

video signal input means for inputting a video signal;

magnification control means for outputting a display magnification signal for controlling an image display magnification;

display means for displaying the input video signal;

a head detection sensor for detecting a viewer's head position and head orientation, and for outputting the same as a first head information signal;

a projection lens for projecting the image displayed on said display means by enlarging the image in accordance with said display magnification signal;

driving means for driving said display means and said projection lens, integrally constructed, in accordance with said first head information signal, and thereby controlling the direction of image projection; and a mirror having prescribed transmissivity such that the image projected by said projection lens is reflected into the viewer's field of view, while, at the same time, allowing the outside light to enter the viewer's eyes.

A see-through type head-mounted display of the present invention (claim 25) in which a displayed image position is changed to match head movement, comprises:

video signal input means for inputting a video signal;

magnification control means for outputting a display magnification signal for controlling an image display magnification;

display means for displaying the input video signal;

a head detection sensor for detecting a viewer's head position and head orientation, and for outputting the same as a first head information signal;

a projection lens for projecting the image displayed on said display means by enlarging the image in accordance with said display magnification signal;

driving means for driving said display means and said projection lens as an integral unit in accordance with said first head information signal, and thereby controlling the direction of image projection; and a reflective/transmissive panel constructed from a transparent panel and a liquid-crystal panel attached back-to-back, said liquid-crystal panel being driven in accordance with said image control signal.

A see-through type head-mounted display of the present invention (claim 27) for viewing outside light and a displayed image in overlaid fashion with a position of the displayed image being changed to match head movement, comprising:

video signal input means for inputting a video signal;

a liquid-crystal panel for displaying an input image;

an eyepiece, interposed between said liquid-crystal panel and a viewer, for bringing the image of said liquid-crystal panel into focus within a clear vision range of the viewer;

a magnification adjusting lens positioned behind said liquid-crystal panel, as viewed from the viewer, and whose magnification is the reciprocal of that of the eyepiece;

a head detection sensor for detecting the viewer's head position and head orientation, and for outputting the same as a first head information signal; and driving means for moving said liquid-crystal panel, said eyepiece, and said magnification adjusting lens as an integral unit in vertical and horizontal directions in accordance with said first head information signal, and thereby controlling the same to a desired position.

A see-through type head-mounted display of the present invention (claim 29) in which a displayed image position is changed to match head movement, comprises:

video signal input means for inputting a video signal;

display means for displaying an input image signal;

an eyepiece, interposed between said display means and a viewer, for bringing the image of said display means into focus within a clear vision range of the viewer;

a head detection sensor for detecting the viewer's head position and head orientation, and for outputting the same as a first head information signal; and driving means for moving said display means and said eyepiece as an integral unit in vertical and horizontal directions in accordance with said first head information signal, and thereby controlling the same to a desired position.

According to the invention as disclosed in claims 1 to 4 having the above-outlined features, head detecting means detects the position and orientation of the viewer's head, and outputs the result of the detection as a first head information signal. Line-of-sight detecting means detects the direction of the viewer's line of sight, and outputs the result of the detection as a line-of-sight information signal. From the first head information signal and the line-of-sight information signal, filter control means generates a filter control signal for controlling the pass band of the first head information signal and supplies the same to variable filter means. The variable filter means, with its filter characteristic controlled by the filter control signal, smoothes the first head information signal and outputs a second head information signal. Image generating means generates an image by using the second head information signal and line-of-sight information signal. When the speed of the viewer's line of sight movement is low, and the speed of head movement is also low, it is judged that the viewer is watching a particular object, and the first head information signal is smoothed, using which the image is generated. Conversely, when the speed of the viewer's line of sight movement is high, or when the speed of head movement has increased, the image is generated without smoothing the first head information signal, and control is performed to minimize time lag rather than suppressing minute shaking that may be caused in the displayed image.

According to the invention as disclosed in claims 5 to 7, head detecting means detects the position and orientation of the viewer's head, and outputs the result of the detection as a first head information signal. From the first head information signal, filter control means generates a filter control signal for controlling the pass band of this signal, and supplies the same to variable filter means. The variable filter means, with its filter characteristic controlled by the filter control signal, smoothes the first head information signal and outputs a second head information signal. In this way, the displayed image is controlled by using only signals representing the speed and acceleration of the viewer's head movement. More specifically, when the speed and acceleration of head movement are almost zero, it is judged that the viewer's head is stationary. In this case, control is performed to suppress minute shaking of the displayed image. On the other hand, when the speed or acceleration of head movement is large in absolute value, it is judged that the viewer's head position is changing. In this case, control is performed to minimize time lag in displaying the image.

According to the invention as disclosed in claim 8, head detecting means detects the position and orientation of the viewer's head, and outputs the result of the detection as a first head information signal. Line-of-sight detecting means detects the direction of the viewer's line of sight, and outputs the result of the detection as a line-of-sight information signal. From the line-of-sight information signal and the first head information signal, threshold control means generates a threshold control signal for comparing the current and previous first head information signals. Thresholding means thresholds the first head information signal by using the threshold control signal, and outputs a second head information signal. Image generating means generates an image by using the second head information signal and line-of-sight information signal. In this way, by thresholding the first head information signal, control is performed to suppress minute shaking when the viewer is watching a particular object. On the other hand, when the viewer's line of sight is moving, or when his head is moving, control is performed to suppress time lag in displaying the image.

According to the invention as disclosed in claims 9 and 10, head detecting means detects the position and orientation of the viewer's head, and outputs the result of the detection as a first head information signal. Threshold control means generates a threshold control signal for comparing the current and previous first head information signals. Thresholding means thresholds the first head information signal by using the threshold control signal, and outputs a second head information signal. Image generating means generates an image by using the second head information signal. When the speed and acceleration of the viewer's head movement are almost zero, it is judged that the viewer's head is stationary, and control is performed to suppress minute shaking of the displayed image. On the other hand, when the speed and acceleration of head movement is large in absolute value, control is performed to minimize time lag in displaying the image rather than suppressing shaking of the displayed image.

According to the invention as disclosed in claims 11 to 14, head detecting means detects the position and orientation of the viewer's head, and outputs the result of the detection as a first head information signal. Line-of-sight detecting means detects the direction of the viewer's line of sight, and outputs the result of the detection as a line-of-sight information signal. From the first head information signal and the line-of-sight information signal, head information control means generates a moving amount control signal for output. When translating the first head information signal in accordance with the moving amount control signal, head information translating means generates a translated head information signal to retain the image in the viewer's viewing direction when the display screen is moved to match the movement of the viewer's head. Image generating means generates an image from the translated head information signal and the line-of-sight information signal output from the line-of-sight detecting means. In this way, when the viewer has rotated his head while keeping his eyes on a particular object in the displayed image, the rotation of the displayed image is made smaller than the amount of head rotation, preventing the object he is looking at from moving outside the field of view.

According to the invention as disclosed in claims 15 to 18 having the above-outlined features, the input image is transformed into an image of a desired size, and is displayed at a desired position on the display panel or at a position that matches the viewer's head position and head orientation. Furthermore, the backlight illuminates only the displayed position of the input image, and the displayed image is projected by the projection lens onto the half-silvered mirror. The half-silvered mirror reflects the light projected through the projection lens, while transmitting an outside image located in front of the viewer, so that the outside light and the reflected light, one overlaid on the other, reach the viewer's eyes.

According to the invention as disclosed in claims 19 to 22, the input image is transformed into an image of a desired size, and is displayed at a desired position on the display panel or at a position that matches the viewer's head position and head orientation. Furthermore, the backlight illuminates only the displayed position of the input image, and the displayed image is projected by the projection lens onto the reflective/transmissive panel. The reflective/transmissive panel, which is constructed from a glass or acrylic transparent panel and a liquid-crystal panel attached back-to-back, is controlled so that the liquid-crystal panel darkens in areas where the image is projected, while becoming transparent in other areas. That is, the reflective/transmissive panel reflects light on the image-projected areas so that the projected image is reflected into the viewer's eyes, while transmitting light in other areas so that the light in the outside world in front of the viewer reaches the viewer's eyes.

According to the invention as disclosed in claims 23 and 24, the input image is projected to a desired size through the projection lens. The drive rotates the display and the projection lens in a desired direction or in a direction that matches the viewer's head position and head orientation, and the image is projected onto the half-silvered mirror. The half-silvered mirror reflects the light projected through the projection lens, while transmitting an outside image located in front of the viewer, so that the outside light and the reflected light, one overlaid on the other, reach the viewer's eyes.

According to the invention as disclosed in claims 25 and 26, the input image is projected to a desired size through the projection lens. The drive rotates the display and the projection lens in a desired direction or in a direction that matches the viewer's head position and head orientation, and the image is projected onto the reflective/transmissive panel. The reflective/transmissive panel, which is constructed from a glass or acrylic transparent panel and a liquid-crystal panel attached back-to-back, is controlled so that the liquid-crystal panel darkens in areas where the image is projected, while becoming transparent in other areas. That is, the reflective/transmissive panel reflects light on the image-projected areas so that the projected image is reflected into the viewer's eyes, while transmitting light in other areas so that the light in the outside world in front of the viewer reaches the viewer's eyes.

According to the invention as disclosed in claims 27 and 28, the input image is displayed on the display, and the liquid-crystal panel, the eyepiece, and the magnification adjusting lens are moved to a desired position or in a direction that matches the viewer's head position and head orientation. When light from the outside world enters the magnification adjusting lens, the outside light is reduced in size by a prescribed ratio. The reduced image is transmitted through the liquid-crystal panel and magnified through the eyepiece by a prescribed ratio for viewing by the viewer. On the other hand, the image displayed on the liquid-crystal panel is magnified through the eyepiece by a prescribed ratio for viewing by the viewer. The viewer thus views the outside image and the image displayed on the liquid-crystal panel, one overlaid on the other.

According to the invention as disclosed in claims 29 and 30, the input image is displayed on the display, and the display itself is moved to a desired position or in a direction that matches the viewer's head position and head orientation. The viewer views the image displayed on the display as well as an outside image through portions surrounding the display.

BRIEF DESCRIPTION OF THE DRAWINGS

FIG. 4 is a diagram for explaining the function of a filter coefficient calculation circuit in the first embodiment;

FIG. 18 is a schematic diagram showing a display produced on a display device in the sixth embodiment;

FIG. 20 is an external view of a head tracker in the sixth embodiment;

FIG. 21 is a schematic diagram showing memory contents according to the sixth embodiment;

DESCRIPTION OF THE PREFERRED EMBODIMENTS

Figure 1:
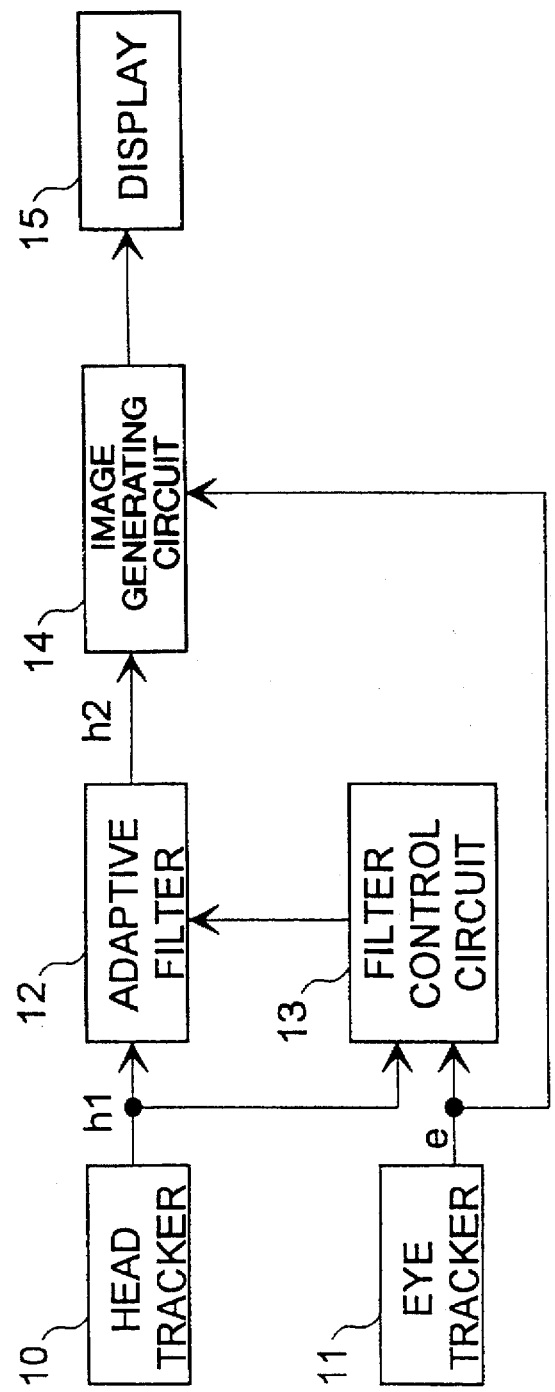
FIG. 1 is a block diagram showing the general configuration of a head-mounted display according to a first embodiment of the invention.

A head-mounted display in a first embodiment of the invention will be described with reference to drawings. FIG. 1 is a block diagram showing the general configuration of the head-mounted display of the first embodiment. In the figure, a head tracker 10 constitutes a head detecting means for detecting the position and orientation of a viewer' head, and for outputting a first head information signal h1 representing its absolute position and absolute orientation. An eye tracker 11 constitutes a line-of-sight detecting means for detecting the direction of the viewer's line of sight, and for outputting a line-of-sight information signal e representing its absolute direction. An adaptive filter circuit 12, whose filter coefficient is set by a filter control signal output from a filter control circuit 13, constitutes a variable filter means for smoothing the head information signal h1 input thereto, and for outputting a second head information signal h2. The filter control circuit 13 constitutes a filter control means for determining the coefficient of the adaptive filter circuit 12, and for outputting the filter control signal. An image generating circuit 14 constitutes an image generating means for generating an image by using the head information signal h2 and line-of-sight information signal e. An image display 15 is a device for displaying an image output from the image generating circuit 14.

Figure 2:
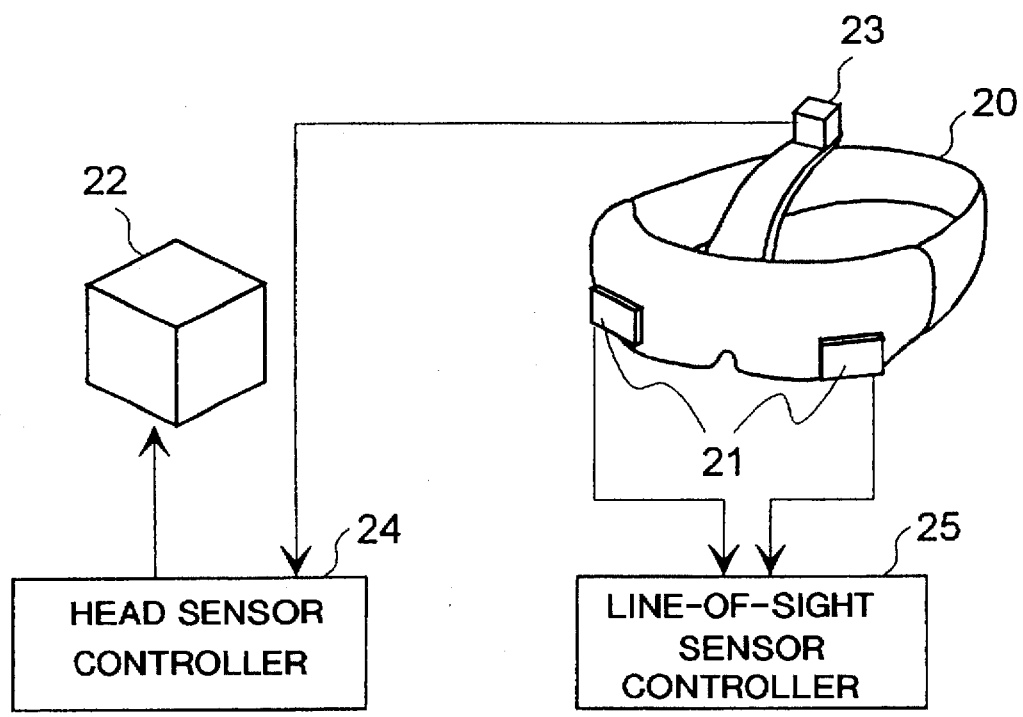
FIG. 2 is a schematic diagram showing the external construction of the head-mounted display and its peripheral circuitry according to the first embodiment.

FIG. 2 is a diagram showing an external view of the head-mounted display 20, which is worn by a viewer, and its peripheral circuitry. As shown in the figure, the head tracker 10 comprises a source coil 22, a sensor coil (also called a head sensor) 23, and a head sensor controller 24. The eye tracker 11 comprises a pair of line-of-sight sensors 21, one for each eye, and a line-of-sight sensor controller 25.

It is assumed here that the head tracker 10 uses a magnetic sensor. The principle of this magnetic sensor will be described. The source coil 22 and the sensor coil 23 are constructed from crossed coils. These are connected to the head sensor controller 24. The source coil 22 is excited under direction of the head sensor controller 24, creating a magnetic field; when the viewer moves in this magnetic field, a voltage is induced in the sensor coil 23, and the voltage is detected by the head sensor controller 24. This induced voltage is processed by computation, to generate a signal that matches the movement of the head. This signal is the head information signal h1. The head information signal h1 contains spatial position information (simply called the position information) and spatial rotation information (simply called the rotation information) of the sensor coil 23 relative to the source coil 22.

The line-of-sight sensors 21 are each implemented, for example, by a sensor based on a sclerotic reflection method. The sclerotic reflection method is a technique that involves illuminating an eyeball with infrared light and receiving the reflected light with a light-receiving element, and measures the eyeball position by utilizing the difference of reflectivity between the iris and the whites of the eye. This sensor consists of an infrared illuminator and light-receiving elements arrayed in horizontal and vertical directions. Voltage changes in the light-receiving elements are processed by computation in the line-of-sight sensor controller 25, to generate a signal that matches the eyeball position. This signal is the line-of-sight information signal e. The line-of-sight information signal e contains information concerning the horizontal and vertical rotation angles of the eyeball.

As shown in FIG. 1, the head information signal h1 output from the head tracker 10 is supplied to the adaptive filter circuit 12 and the filter control circuit 13. The line-of-sight information signal e output from the eye tracker 11 is supplied to the image generating circuit 14 as well as to the filter control circuit 13.

Figure 3:
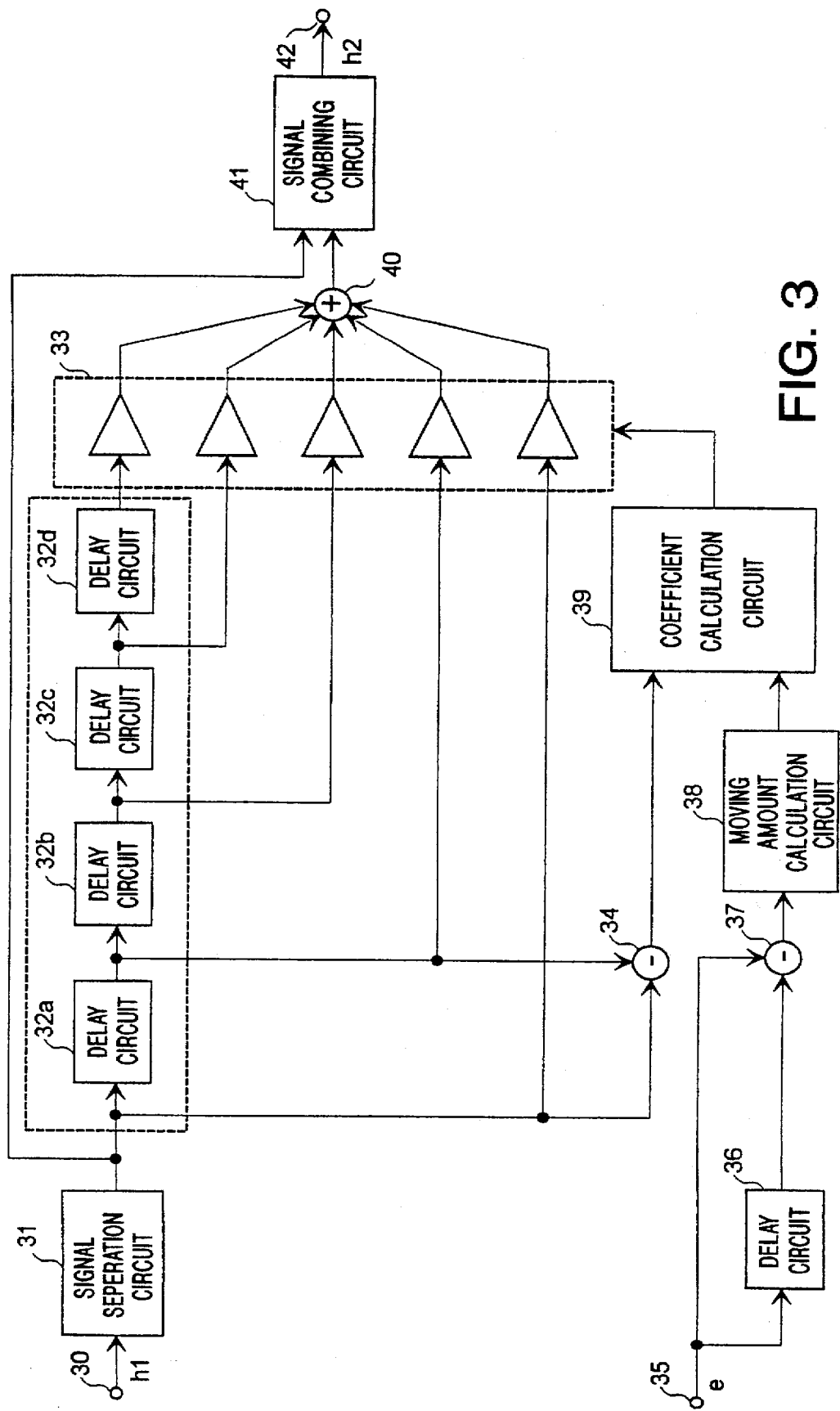
FIG. 3 is a block diagram showing the configuration of an adaptive filter circuit and filter control circuit in the first embodiment.

The adaptive filter circuit 12 and the filter control circuit 13 will be described below with reference to FIG. 3. FIG. 3 is a block diagram showing the adaptive filter circuit 12 and the filter control circuit 13 together. In the figure, the head information signal h1 input via an input terminal 30 is supplied to a signal separation circuit 31. The signal separation circuit 31 is a circuit for extracting the position information and rotation information from the head information signal h1. Hereinafter, the position information and rotation information together are designated by the head information signal h1.

A delay circuit block 32, comprising a plurality of delay circuits 32a to 32d connected in series, constitutes a delay means for delaying the head information signal h1. The output of the signal separation circuit 31 and the output of each of the delay circuits 32a to 32d are applied to a multiplier block 33. The multiplier block 33 constitutes a multiplying means which consists of (n+1) multipliers, where n is the number of delay circuits 32a to 32d. The multiplying factor of each multiplier is supplied from a filter coefficient calculation circuit 39. A subtractor 34 is a circuit for calculating the difference between the input and output signals of the delay circuit 32a. The difference value is supplied to the filter coefficient calculation circuit 39.

On the other hand, the line-of-sight information signal e input via an input terminal 35 is fed to a delay circuit 36 and a subtractor 37. The delay circuit 36 is a circuit for delaying the line-of-sight information signal e by a unit time. The subtractor 37 is a circuit for calculating the difference between the input and output signals of the delay circuit 36. A moving amount calculation circuit 38 is a circuit for accepting at its input the difference value output from the subtractor 37, and thereby calculating the amount of movement of the line of sight. The filter coefficient calculation circuit 39 is a circuit that takes the outputs of the subtractor 34 and the moving amount calculation circuit 38 as addresses and that outputs coefficient information (filter coefficients) for the multiplier block 33. The filter coefficient calculation circuit 39 is constructed, for example, from a ROM table accommodating data for adaptively controlling the tap coefficients of the respective delay circuits. An adder 40 is a circuit for adding the outputs of the multipliers in the multiplier block 33, and for outputting the resulting sum as a translated head information signal. A signal combining circuit 41 is a circuit for combining the head information signal h1 with the sum from the adder 40, and for outputting the combined result as the second head information signal h2. The head information signal h2 is output via an output terminal 42 and sent to the image generating circuit 14 in FIG. 1.

The operation of the thus configured head-mounted display of the first embodiment will be described next. Here, consider the situation where a VR user (viewer) is wearing the head-mounted display 20 shown in FIG. 2 on his head and viewing an image presented on the display 15 mounted in the goggles. It is assumed here that the viewer's attention is focused on a particular image on the screen, while viewing the entire screen. If that particular image moves to the left or to the right, for example, usually the viewer's attention point also moves to the left or to the right. Even if the viewer's attention is not focused on a particular image, it is desirable that turning the viewer's head to the left or right cause the field of view of the display screen to shift in the same direction as the direction in which the viewer's head is turned. This produces the so-called VR image effect. The head information signal h1 is input to the signal separation circuit 31 via the input terminal 30 shown in FIG. 3. Designating the left/right direction of the display screen as x-axis, the up/down direction as y-axis, and an axis perpendicular to the xy plane as z-axis, the head information signal h1 contains the spatial position information (x-coordinate, y-coordinate, z-coordinate) and spatial rotation information (x-axis rotation angle, y-axis rotation angle, z-axis rotation angle) of the head, thus providing a total of six parameters. It is assumed here that the signal separation circuit 31 separates one parameter, for example, a y-axis rotation signal (corresponding to head rotation in the left/right direction of the display screen), as a signal to be processed. The signal to be processed is delayed through the delay circuit block 32, and the resulting (n+1)(=5) signals with different delay times are input to the multiplier block 33. The subtractor 34 calculates the difference between the signal to be processed and the output of the delay circuit 32a, and supplies the resulting signal to the filter coefficient calculation circuit 39 as the angle of rotation about y-axis (the amount of head movement). On the other hand, the line-of-sight information signal e input via the input terminal 35 contains two line-of-sight parameters (angle along x direction, angle along y direction). The line-of-sight information signal e is directly fed to the subtractor 37 on one hand, and is delayed through the delay circuit 36 on the other hand. The subtractor 37 calculates the difference between the delayed line-of-sight information signal e and the non-delayed line-of-sight information signal e, and outputs the resulting signal as the angle of movement of the line of sight (the amount of rotation of the line of sight) per unit time. The moving amount calculation circuit 38 accepts the signal from the subtractor 37 at its input and performs calculations to translate it into the amount of two-dimensional movement of the line of sight. The result of the calculation is fed to the filter coefficient calculation circuit 39.

The filter coefficient calculation circuit 39 accepts at its inputs the amount of head movement output from the subtractor 34 and the amount of line-of-sight movement output from the moving amount calculation circuit 38, and generates a filter coefficient such as shown in FIG. 4. As shown in FIG. 4, the value output as the filter coefficient is such that, as the amount of head movement increases, the number of filter stages is reduced in effect (THROUGH), thus widening the pass frequency band of the adaptive filter circuit 12; on the other hand, as the amount of head movement decreases, the number of filter stages is increased in effect (LOWPASS), thus limiting the pass frequency band of the adaptive filter circuit 12 to the low frequency side. Furthermore, the filter coefficient generation is such that the number of filter stages is increased as the amount of line-of-sight movement decreases, and is reduced as it increases.

When the amount of head movement is small, it is considered that the viewer is watching an image while he is staying almost stationary, and therefore, an image display time lag becomes imperceptible to the viewer. Instead, noise components from the head tracker 10 and high-frequency components due to minute shaking of the viewer's head tend to become perceptible. It is therefore more important to suppress minute shaking of the image, rather than suppressing an image display lag. To achieve this, the filter coefficient is so determined as to increase the number of filter stages in effect, thus limiting the pass band of the adaptive filter circuit 12 to the low-frequency range.

On the other hand, when the amount of head movement is large, it is considered that the viewer's viewpoint is not fixed. In such cases, high-frequency components due to the shaking or shift of the entire display screen are less perceptible, but instead, an image update delay becomes very noticeable. Accordingly, the filter coefficient of the adaptive filter circuit 12 is so determined as to reduce the number of filter stages in effect, thereby eliminating the time delay.

In FIG. 4, the same approach is adopted for the amount of line-of-sight movement. That is, when the amount of line-of-sight movement is small, it is decided that the viewer's viewpoint is directed to one particular point. In this case, the number of filter stages is increased to suppress minute shaking of the display screen. On the other hand, when the amount of line-of-sight movement is large, the filter coefficient is so determined as to reduce the number of filter stages to suppress time delay.

However, when the amount of head movement and the amount of line-of-sight movement are almost equal in absolute magnitude but their directions are opposite to each other, this means that the viewer is moving his head while keeping his eyes on a particular image. Therefore, the filter coefficient is so determined as to provide low-pass filtering.

The filter coefficient determined in this manner is supplied to the multiplier block 33, thereby setting the multiplying factor of each multiplier. The outputs of the multipliers are added together in the adder 40. The resulting sum as the translated head information signal is input to the signal combining circuit 41, where it is combined with the position information and rotation information of the head. The signal combining circuit 41 outputs the combined value as the second head information signal h2, which is supplied via the output terminal 42 to the image generating circuit 14 in FIG. 1. Based on the thus created head information signal h2, the image generating circuit 14 determines the range of the image to be generated next. Then, a necessary image is fetched from the outside, and an image based on the viewer's decision is produced on the image display 15.

Here, the delay circuit 32a and the subtractor 34 together implement the function of a first calculating means for calculating the amount of head movement or the amount of head rotation per unit time from the first head information signal h1. On the other hand, the delay circuit 36 and the subtractor 37 together implement the function of a second calculating means for calculating the amount of line-of-sight movement per unit time from the line-of-sight information signal e.

The filter coefficient calculating circuit 39 may be constructed from a ROM that holds therein filter coefficients precalculated by assuming information on all possible ranges that the output of the subtractor 34 and the output of the moving amount calculation circuit 38 can take. In FIG. 3, the delay circuit block 32 has been described as consisting of four delay circuits, but it will be appreciated that the construction can be implemented by one or more delay circuits, with the corresponding number of multipliers in the multiplier block 33. Furthermore, in the image generating circuit 14, the line-of-sight information signal e can be used as a line-of-sight interface with the viewer.

The operation has been described by assuming that only the y-axis rotation signal is separated by the signal separation circuit 31, but any other signal may be selected as the signal to be separated. It is also possible to perform similar processing concurrently on multiple signals. Such concurrent processing can be achieved by providing more than one adaptive filter circuit 12 and more than one filter control circuit 13, or by using a time-division multiplexing technique.

Furthermore, the head tracker 10 has been described as being implemented using a magnetic sensor, but it will be recognized that it can be implemented using an ultrasonic sensor or any other type of sensor. Also, although the eye tracker 11 has been described as being implemented using a sensor based on the sclerotic reflection method, the same function can be accomplished by image processing using a CCD camera or any other type of sensor.

Figure 5:
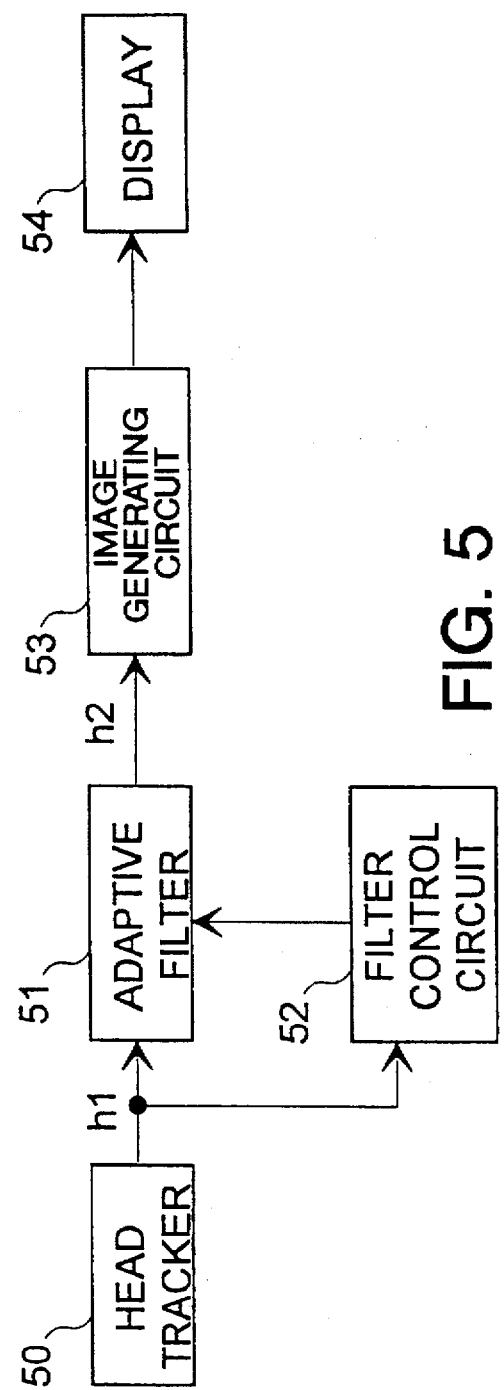
FIG. 5 is a block diagram showing the general configuration of a head-mounted display according to a second embodiment of the invention.

A head-mounted display in a second embodiment of the invention will be described with reference to drawings. FIG. 5 is a block diagram showing the configuration of the head-mounted display of the second embodiment. In the figure, a head tracker 50 constitutes a head detecting means for detecting the position and orientation of a VR viewer' head, and for outputting a first head information signal h1 representing its absolute position and absolute orientation. An adaptive filter circuit 51, whose filter coefficient is set by a filter control signal output from a filter control circuit 52, constitutes a variable filter means for outputting a second head information signal h2 by smoothing the head information signal h1. The filter control circuit 52 constitutes a filter control means for creating the filter control signal from the head information signal h1. An image generating circuit 53 constitutes an image generating means for generating a VR image by using the head information signal h2. An image display 15 is a device for displaying an image output from the image generating circuit 53.

Figures 6, 8:
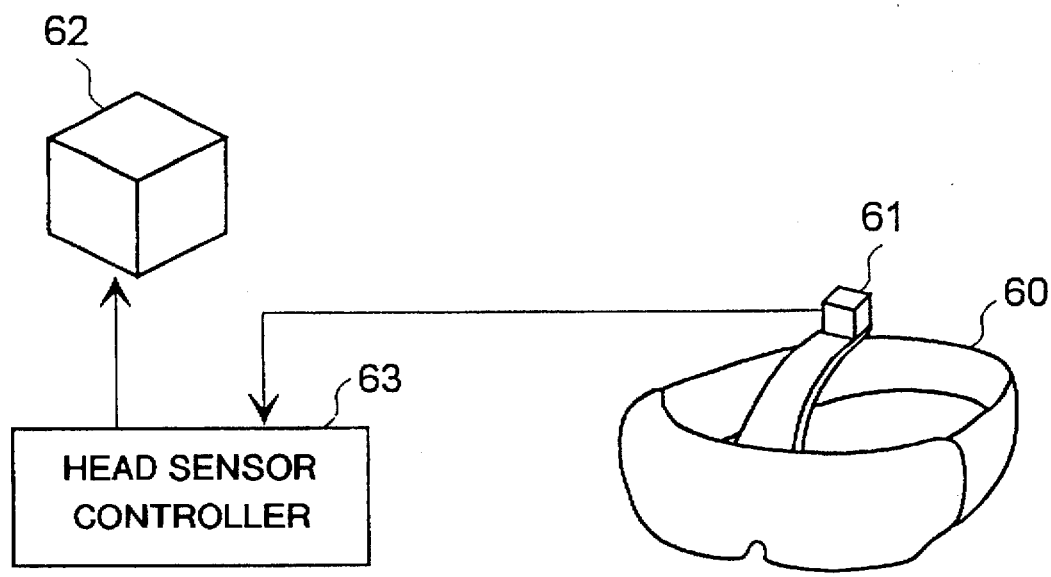
FIG. 6 is a schematic diagram showing the external construction of the head-mounted display and its peripheral circuitry according to the second embodiment.
FIG. 8 is a diagram for explaining the function of a filter coefficient calculation circuit in the second embodiment.

FIG. 6 is a diagram showing the head-mounted display 60, which is worn by a viewer, and its peripheral circuitry. As shown in the figure, the head tracker 50 comprises a sensor coil 61 mounted on the goggles, a source coil 62 fixed in place, and a head sensor controller 63 which is connected to the sensor coil 61 and the source coil 62. The operating principle of the head tracker 50 is the same as that of the first embodiment, and therefore, explanation thereof will not be repeated here.

When the VR viewer puts on the head-mounted display 60, spatial position information (x-coordinate position, y-coordinate position, z-coordinate position) and spatial rotation information (rotation about x-axis, rotation about y-axis, rotation about z-axis) of the sensor coil 61 relative to the source coil 62 are output as the head information signal h1.

As shown in FIG. 5, the head information signal h1 output from the head tracker 50 is supplied to the adaptive filter circuit 51 and the filter control circuit 52. The adaptive filter circuit 51 and the filter control circuit 52 will be described below with reference to FIG. 7.

Figure 7:
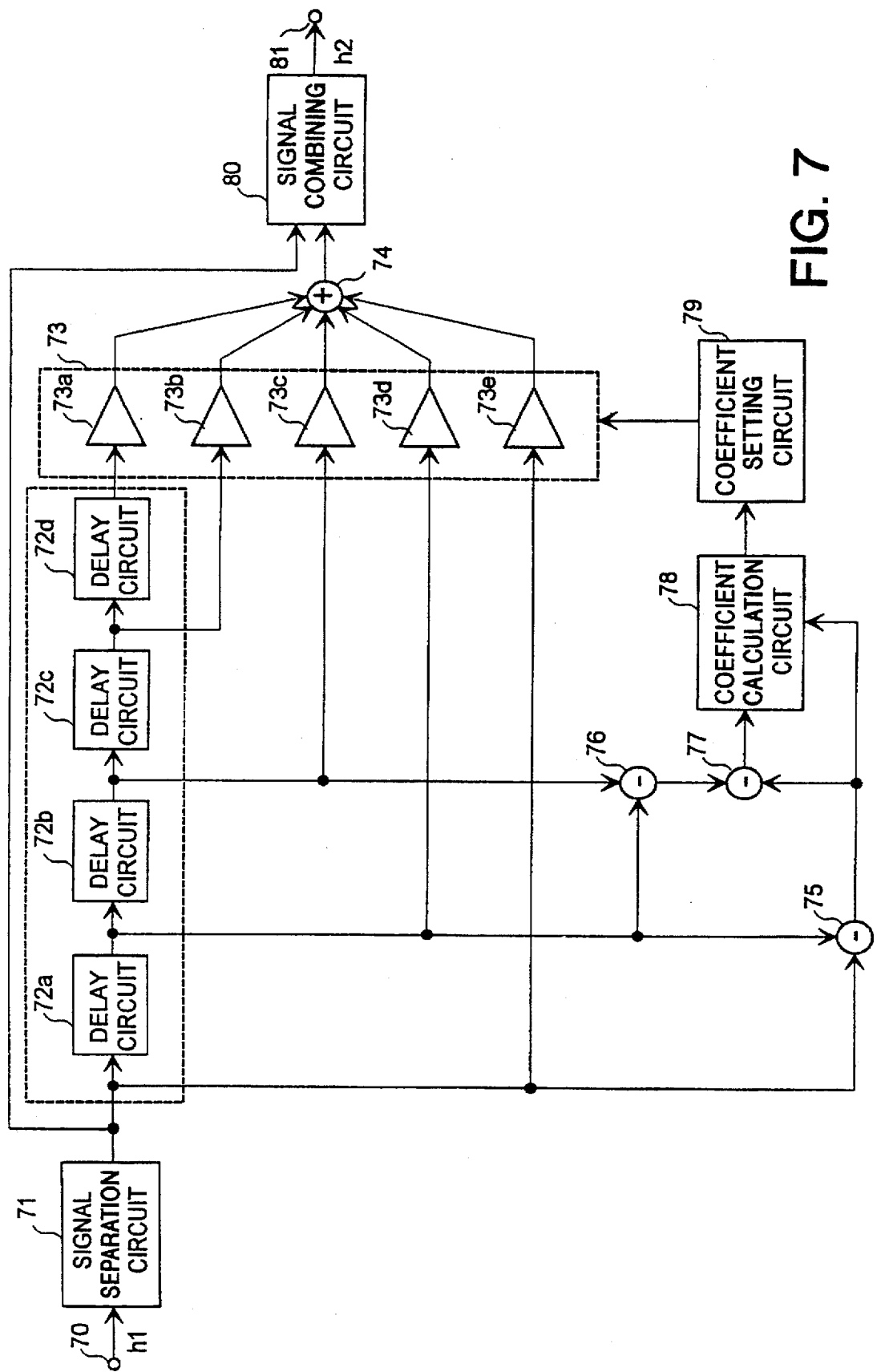
FIG. 7 is a block diagram showing the configuration of an adaptive filter circuit and filter control circuit in the second embodiment.

FIG. 7 is a block diagram showing the adaptive filter circuit 51 and the filter control circuit 52 together. The head information signal h1 input via an input terminal 70 is supplied to a signal separation circuit 71. The signal separation circuit 71 is a circuit for extracting a designated signal from the head information signal h1. A delay circuit block 72 constitutes a delay means for delaying the head information signal h1 by a prescribed time; in the illustrated example, this block comprises four delay circuits 72a to 72d connected in series. The input and output signals of the first delay circuit 72a and the second delay circuit 72b are also supplied to the filter control circuit 52.

The output of the signal separation circuit 71 and the output of each of the delay circuits 72a to 72d are applied to a multiplier block 73. The multiplier block 73, comprising, for example, five multipliers 73a to 73e, constitutes a multiplying means for multiplying the output of the signal separation circuit 71 and the output of each of the delay circuits 72a to 72d by a filter coefficient. An adder is an adding means for adding the outputs of the multiplier block 73, and for outputting the resulting signal as a translated head information signal.

The filter control circuit 52 comprises subtractors 75 to 77, a filter coefficient calculation circuit 78, and a filter coefficient setting circuit 79. The subtractor 75 is the first subtractor for subtracting the output of the delay circuit 72a from the output of the signal separation circuit 71. The subtractor 76 is the second subtractor for subtracting the output of the delay circuit 72b from the output of the delay circuit 72a. The subtractor 77 is the third subtractor for subtracting the output of the subtractor 76 from the output of the subtractor 75.

The filter coefficient calculation circuit 78 is a circuit for calculating a filter coefficient, necessary for the operation of the multiplier block 73, from the output signal of the subtractor 75 and the output signal of the subtractor 77, and for supplying the resulting filter coefficient control signal to the filter coefficient setting circuit 79. Based on the filter coefficient control signal thus input, the filter coefficient setting circuit 79 sets the filter coefficient for each of the multipliers 73a to 73e. The filter coefficient setting circuit 79 is constructed from a memory where all filter coefficients are stored. A signal combining circuit 80 is a circuit for combining the output signal of the adder 74 with the spatial position information separated by the signal separation circuit 71. The signal combining circuit 80 outputs the combined signal as the second head information signal h2, which is supplied via an output terminal 81 to the image generating circuit 53 in FIG. 5.

The operation of the thus configured head-mounted display of the second embodiment will be described next. The use environment of the VR viewer is the same as that described in connection with the first embodiment. When the head information signal h1 output from the head tracker 50 is input via the input terminal 70, the signal separation circuit 71 extracts, for example, a y-axis rotation signal. This signal is supplied to the delay circuit block 72, the multiplier 73e, and the subtractor 75. The signal separation circuit 71 also supplies five signals other than the y-axis rotation signal, to the signal combining circuit 80. The y-axis rotation signal is delayed successively through the delay circuits 72a to 72d, and the resulting signals are applied to the multipliers 73a to 73e in the multiplier block 73.

On the other hand, the subtractor 75 subtracts the output signal of the delay circuit 72a from the signal extracted by the signal separation circuit 71, and outputs a first derivative of the head position or head orientation at a given time. As an example, it is assumed here that an angular velocity $W_m$, of rotation about the y-axis, at a certain sampling time m, is output. The subtractor 76 subtracts the output signal of the delay circuit 72b from the output signal of the delay circuit 72a, and outputs a first derivative of the head position or head orientation at another given time. As an example, it is assumed here that an angular velocity $W_m-1$, of rotation about the y-axis, at a sampling time m-1, is output. The subtractor 77 subtracts the output signal of the subtractor 76 from the output signal of the subtractor 75, and outputs a second derivative of the head position or head orientation at a given time. Since this signal gives a value, $W_m-W_m-1$, in one sampling interval, an angular acceleration, $\Delta\omega$, of rotation about the x-axis, can be obtained from the output of the subtractor 77. The signal representing the angular acceleration $\Delta\omega$ and the signal representing the angular velocity $\omega$ are input to the filter coefficient calculation circuit 78.

In the filter coefficient calculation circuit 78, calculations such as shown in FIG. 8 are performed. In the figure, the velocity plotted along the abscissa represents, for example, the angular velocity $\omega$ of rotation about the y-axis, and the acceleration plotted along the ordinate represents, for example, the angular acceleration $\Delta\omega$ of the same rotational motion. Designations, BIG, MEDIUM, and SMALL, indicated in the figure, represents the degree of filtering. For example, SMALL means setting the multiplying factor to 0 for the multipliers 73a to 73d in FIG. 7, while setting the multiplying factor to 1 for the multiplier 73e. In this case, the filtering effect becomes zero, so that control is performed to reduce time lag in image display. BIG means setting the multiplying factor to 0.2, for example, for all the multipliers 73a to 73e, to calculate the average of head movement; as a result, control is performed to remove high-frequency components causing image shaking, etc., rather than reducing an image display lag.

As shown in FIG. 8, when the velocity is 0 and the acceleration is nearly 0, that is, when the viewer's head is almost stationary, the filtering effect is increased. On the other hand, when the magnitude of velocity and acceleration is large, the filtering coefficient is so determined as to reduce the filtering effect and suppress time lag in image display. The filtering coefficient calculation circuit 78 calculates the filter coefficient in this manner, and supplies the resulting filter coefficient control signal to the filter coefficient setting circuit 79. In accordance with the filter coefficient control signal, the filter coefficient setting circuit 79 sets the multiplying factor for the multipliers 73a to 73e. Then, the adder 74 sums the signals output from the multipliers 73a to 73e, and supplies the resulting sum to the signal combining circuit 80.

The signal combining circuit 80 combines the output signal of the adder 74 with the signal containing the five parameters separated by the signal separation circuit 71, and outputs via the output terminal 81 the head information signal h2 containing six parameters. The image generating circuit 53 in FIG. 5, based on the thus input head information signal h2, generates a VR image to match the head position of the viewer, and outputs the image to the image display 54.

Here, the subtractor 75, subtractor 76, filter coefficient calculation circuit 78, and filter coefficient setting circuit 79 shown in FIG. 7 constitute the filter control circuit 52 in FIG. 5. On the other hand, the filter coefficient calculation circuit 78 and the filter coefficient setting circuit 79 together implement the function of a filter coefficient control means for generating the filter coefficient control signal. In the second embodiment, the delay circuit block 72 has been described as consisting of four delay circuits, but it will be appreciated that the function of the present embodiment can be implemented if at least one delay circuit is provided. Furthermore, the signal separation circuit 71 is constructed to extract the y-axis rotation signal, but it may be constructed to extract more than one parameter. In that case, processing can be implemented by providing more than one adaptive filter circuit 51 and more than one filter control circuit 52, or by using a time-division multiplexing technique.

Figure 9:
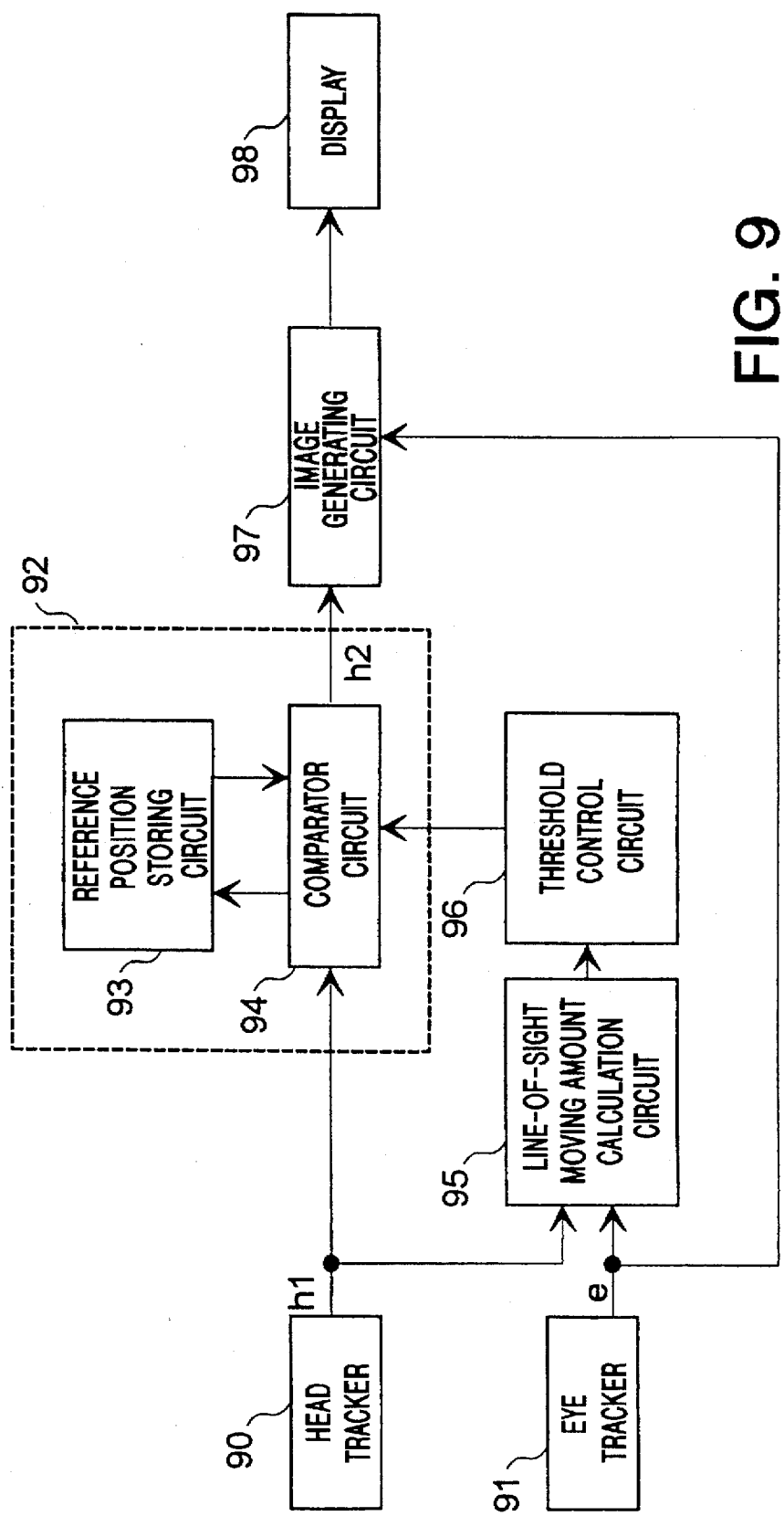
FIG. 9 is a block diagram showing the general configuration of a head-mounted display according to a third embodiment of the invention.

Next, a head-mounted display in a third embodiment of the invention will be described with reference to drawings. FIG. 9 is a block diagram showing the configuration of the head-mounted display of the third embodiment. In the figure, a head tracker 90 constitutes a head detecting means for detecting the position and orientation of a viewer's head, and for outputting a head information signal h1 representing its absolute position and absolute orientation. An eye tracker 91 constitutes a line-of-sight detecting means for detecting the direction of the viewer's line of sight, and for outputting a line-of-sight information signal e representing its absolute direction.

A thresholding circuit 92 constitutes a thresholding means for accepting the first head information signal h1 at its input, and for generating a second head information signal h2 by thresholding the head information signal h1 in accordance with a threshold control signal supplied from a threshold control circuit 96. The thresholding circuit 92 comprises a reference position storing circuit 93 and a comparator circuit 94. The reference position storing circuit 93 is a circuit for storing a head information signal h1 at a given time as a reference position signal. The comparator circuit 94 is a circuit for comparing the current head information signal h1 with the reference position signal stored in the reference position storing circuit 93, and for outputting one or the other of the signals in accordance with the threshold control signal.

A line-of-sight moving amount calculation circuit 95 is a circuit for calculating the amount of movement of the viewer's line of sight relative to the displayed image (the amount of relative movement of the line of sight) on the basis of the head information signal h1 and line-of-sight information signal e. The threshold control circuit 96 constitutes a threshold control means for creating the threshold control signal from the amount of line-of-sight movement, and for supplying it to the comparator circuit 94. An image generating circuit 97 constitutes an image generating means for generating a VR image based on the head information signal h2 output from the comparator circuit 94 and on the line-of-sight information signal e output from the eye tracker 91. An image display 98 is a device for displaying the image output from the image generating circuit 97 in the goggles worn by the viewer. The head-mounted display used in this embodiment is identical in construction as that of the first embodiment shown in FIG. 2.

The operation of the thus configured head-mounted display of the third embodiment will be described next. The operating principles of the head tracker 90 and the eye tracker 91 have already been described in detail in connection with the first embodiment, and therefore, explanation thereof will not be repeated here. The spatial position information (x-coordinate position, y-coordinate position, z-coordinate position) and spatial rotation information (x-axial rotation, y-axis rotation, z-axis rotation) of the viewer's head, output from the head tracker 90, are input to the thresholding circuit 92 as the head information signal h1. Initial position information and initial rotation information are stored in the reference position storing circuit 93. These pieces of information carry the values representing the initial position and orientation of the viewer' head when the viewer saw the VR screen presented for the first time after he put on the head-mounted display.

Next, when the viewer starts to view images presented on the VR screen, the line-of-sight information signal e representing the viewer's line-of-sight information (line-of-sight angular movement along x-axis, line-of-sight angular movement along y-axis) is output from the eye tracker 91, and is input to the line-of-sight moving amount calculation circuit 95 along with the head information signal h1. The line-of-sight signal e represents the direction in which the viewer's eyeballs are directed, relative to the line-of-sight sensors 21 shown in FIG. 2. The line-of-sight moving amount calculation circuit 95 calculates the eyeballs' direction relative to the displayed image by using the head information signal h1 and line-of-sight information signal e. For example, when the amount of head rotation about the y-axis, that is, in a horizontal direction, is Yt degrees and the amount of the eyeballs' line of sight rotation, in a horizontal direction, is Ye degrees, then the amount of horizontal movement of the line of sight relative to the displayed image is given by the absolute value of (Yt−Ye). The same calculation is performed for the vertical direction, to obtain the amount of line-of-sight movement relative to the displayed image.

Figures 10, 12:
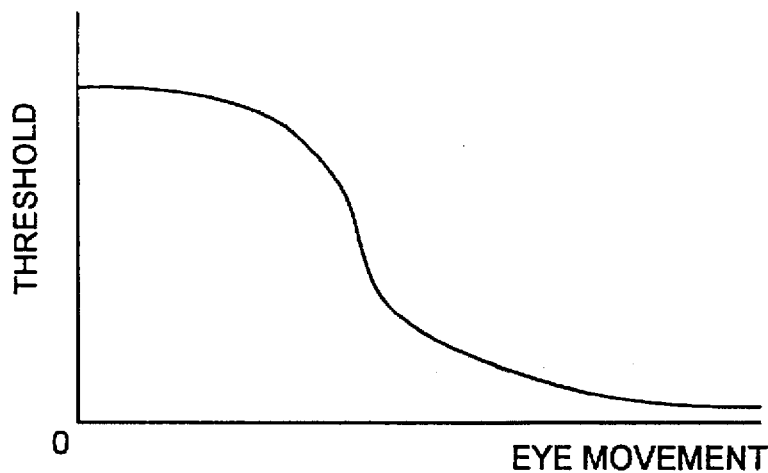
FIG. 10 is a diagram for explaining the function of a threshold control circuit in the third embodiment.
FIG. 12 is a diagram for explaining the function of a threshold control circuit in the fourth embodiment.

The output of the line-of-sight moving amount calculation circuit 95 is supplied to the threshold control circuit 96 which generates a threshold control signal to match the amount of line-of-sight movement. The threshold control circuit 96 performs a signal conversion as shown in FIG. 10. In the figure, control is performed in such a manner that, when the amount of line-of-sight movement, |Yt −Ye|, is small, that is, when the viewer's attention is focused on a particular image, the threshold is raised, and when the amount of line-of-sight movement is large, that is, when the viewer's attention is not focused on any particular image, the threshold is lowered.

The operation of the comparator circuit 94 will be described. The head information signal h1, the signal from the reference position storing circuit 93, and the threshold control signal from the threshold control circuit 96 are input to the comparator circuit 94. Head rotation in a horizontal direction, for example, is processed in the following manner. When the amount of head rotation contained in the head information signal h1 at a given time is denoted by Yn, and the amount of head rotation stored in the reference position storing circuit 93 is denoted by Ys, the difference value between Yn and Ys is calculated. If this difference value is smaller than the threshold determined by the threshold control signal, Ys is output. In this case, Ys remains stored in the reference position storing circuit 93. Conversely, if the difference between Yn and Ys is larger than the threshold, Yn is output. In this case, the value stored in the reference position storing circuit 93 is replaced by Yn. The above description has specifically dealt with the comparison made for the amount of head rotation in a horizontal direction; for head rotation in other directions and head position, similar processing is performed, to create the head information signal h2.

When the head information signal h2 and the line-of-sight information signal e are supplied to the image generating circuit 97, a VR image is generated based on these signals, and an image that matches the intention of the viewer is presented on the image display 98. The line-of-sight information signal e can be used as an interface between the viewer and the generated image. In the above description, the threshold control circuit 96 performed the operation by using the amount of line-of-sight movement, |Yt −Ye|, output from the line-of-sight moving amount calculation circuit 95, but alternatively, a ROM may be used in which threshold values are prestored according to the amount of line-of-sight movement.

In this embodiment, when the amount of relative movement of the line of sight is almost zero, it is judged that the viewer's attention is focused on a particular object in a displayed image even if the image is moved within the display screen. In this case, even if noise is generated from the head tracker 90, minute shaking of the displayed image is suppressed, enabling the viewer to view a stable image at the attention point. On the other hand, when the amount of relative movement of the line of sight is large, the threshold is lowered and an image that matches the amount of the viewer's head movement is displayed, thus improving the response to head movement.

Figure 11:
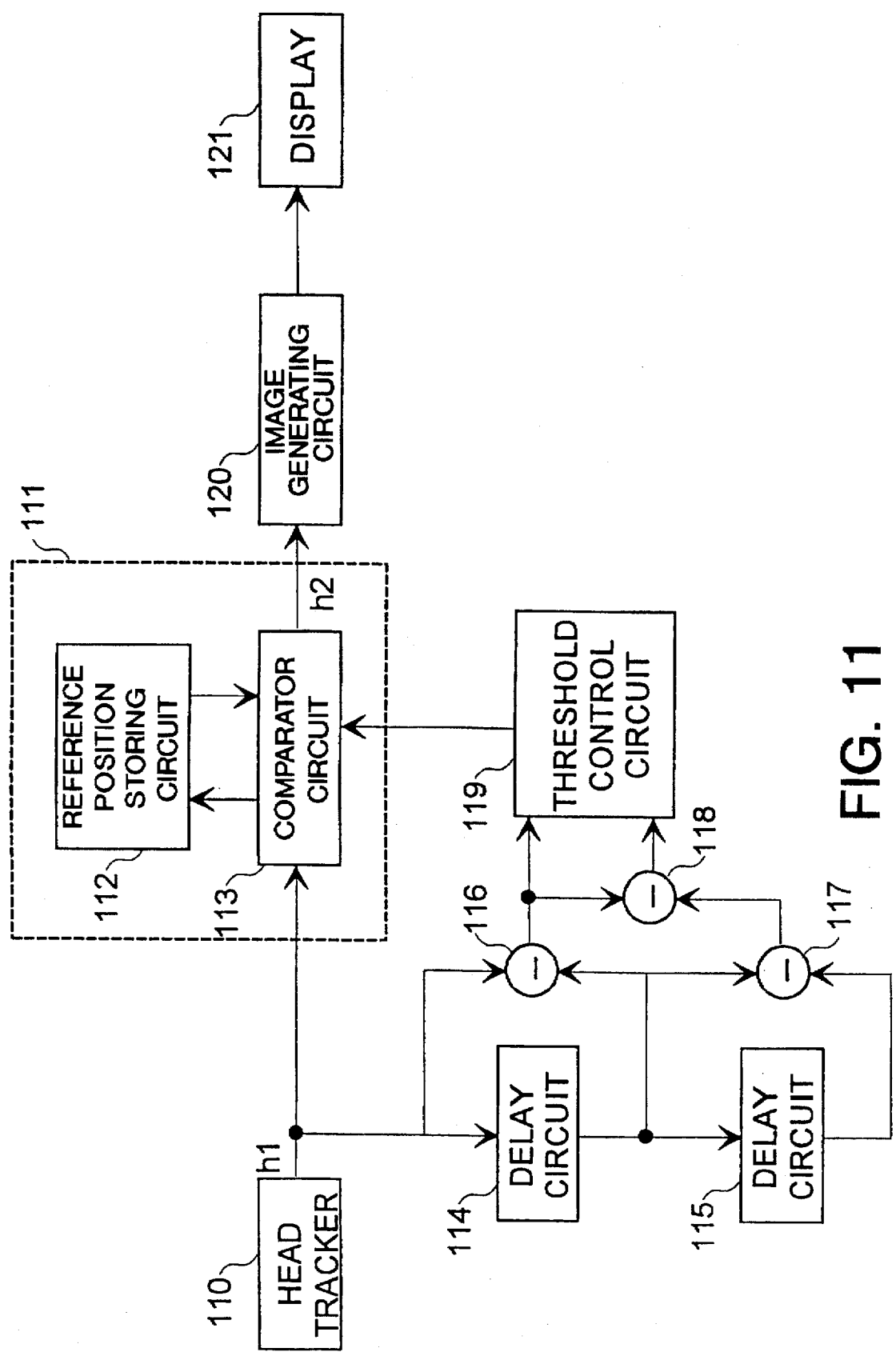
FIG. 11 is a block diagram showing the general configuration of a head-mounted display according to a fourth embodiment of the invention.

Next, a head-mounted display in a fourth embodiment of the invention will be described with reference to drawings. FIG. 11 is a block diagram showing the configuration of the head-mounted display of the fourth embodiment. In the figure, a head tracker 110 constitutes a head detecting means for detecting the position and orientation of a viewer's head, and for outputting a first head information signal h1 representing its absolute position and absolute orientation. A thresholding circuit 111 constitutes a thresholding means for outputting a second head information signal h2 by thresholding the head information signal h1. Like the corresponding circuit of third embodiment, the thresholding circuit 111 also comprises a reference position storing circuit 112 and a comparator circuit 113. The reference position storing circuit 112 is a circuit for temporarily storing the head information signal h1. The comparator circuit 113 is a circuit for comparing the current head information signal h1 with the reference head position information signal stored in the reference position storing circuit 111, and for outputting one or the other of the signals in accordance with threshold information supplied from a threshold control circuit 119.

Delay circuits 114 and 115, each for delaying the head information signal h1 by a prescribed time, are connected in series with the head tracker 110. A subtractor 116 is a circuit for subtracting an output signal of the delay circuit 114 from an input signal of the same. Likewise, a subtractor 117 is a circuit for subtracting an output signal of the delay circuit 115 from an input signal of the same. A subtractor 118 is a circuit for subtracting an output signal of the delay circuit 117 from an output signal of the delay circuit 116. A threshold control circuit 119 constitutes a threshold control means which, based on the output signals of the subtractors 116 and 118, outputs threshold information which is supplied to the comparator circuit 113. An image generating circuit 120 constitutes an image generating means for generating a VR image on the basis of the second head information signal h2 output from the thresholding circuit 111. An image display 121 is a device for displaying the generated image in the goggles worn by the viewer. The external view of the head-mounted display of this embodiment is the same as that of the second embodiment.

The operation of the thus configured head-mounted display of the fourth embodiment will be described next. The operating principle of the head tracker 110 has already been described in detail in connection with the first embodiment, and therefore, explanation thereof will not be repeated here. The head tracker 110 outputs the viewer's spatial position information (x-coordinate position, y-coordinate position, z-coordinate position) and spatial rotation information (x-axial rotation, y-axis rotation, z-axis rotation) as the head information signal h1 which is supplied to the thresholding circuit 111. The head information signal h1 is also supplied to the delay circuit 114 where it is delayed by a prescribed time. The thus delayed signal is further delayed by a prescribed time through the delay circuit 115.

The subtractor 116 subtracts the output signal of the delay circuit 114 from the output signal of the head tracker 110. If the head information signal h1 is a signal representing the head position along the y-axis at a given time m, the output of the subtractor 116 represents the amount of head movement in unit time, that is, the speed of head movement. The subtractor 117 subtracts the output signal of the delay circuit 115 from the output of the delay circuit 114. The output of the delay circuit 117 therefore represents the amount of head movement in unit time at time m−1, that is, the speed, v, of head movement.

The subtractor 118 subtracts the output signal of the subtractor 117 from the output signal of the subtractor 116. The output of the subtractor 118 therefore represents the amount of change of the speed of head movement in unit time, that is, the acceleration, α, of head movement. Thus, the speed, v, of head movement and the acceleration, α, of head movement are input to the threshold control circuit 119. Based on the speed, v, of head movement and the acceleration, α, of head movement, the threshold control circuit 119 performs the calculation shown in FIG. 12 and outputs threshold information, SMALL, MEDIUM, or BIG, to the thresholding circuit 111.

The operation of the thresholding circuit 111 will be described next. The reference position storing circuit 112 and the comparator circuit 113 have already been described in detail in connection with the third embodiment, and therefore, explanation thereof will not be repeated here. As shown in FIG. 12, when the speed, v, of head movement is almost zero and the acceleration, α, of head movement is also almost zero, that is, when the viewer's head is almost stationary, the threshold is raised. This suppresses minute shaking of images due to noise from the head tracker 110, etc. On the other hand, when the speed, v, of head movement is large in magnitude and the acceleration, α, of head movement is also large in magnitude, that is, when the viewer's head has abruptly begun to move, the threshold is lowered. This suppresses image lags with respect to the viewer's head motion.

The head information signal h2 thus output from the comparator circuit 113 is supplied to the image generating circuit 120 which then generates a VR image to match the viewer's head position, for display on the image display 121. The threshold control circuit 119 may be constructed from a ROM where threshold values corresponding to output values representing the speed and acceleration of head movement are stored in advance. In FIG. 11, the delay circuits 114 and 115, the subtractors 116, 117, and 118, and the threshold control circuit 119 together constitute a threshold control means for generating a threshold control signal. Further, the delay circuits 114 and 115 and the subtractors 116, 117, and 118 together constitute a third calculating means for calculating from the first head information signal h1 the speed of head movement or head rotation at unit time and the acceleration of head movement or head rotation over unit time.

Figure 13:
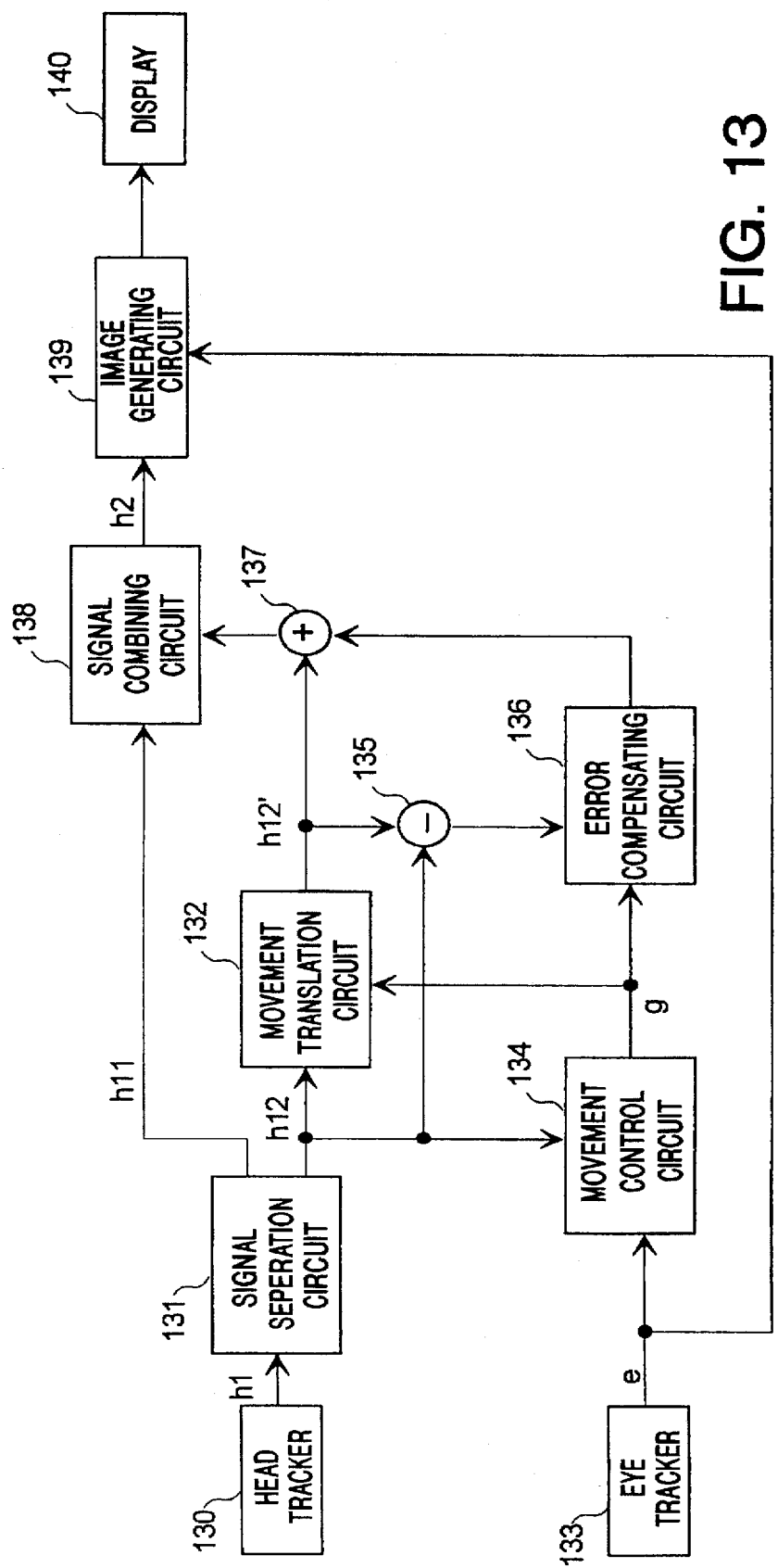
FIG. 13 is a block diagram showing the general configuration of a head-mounted display according to a fifth embodiment of the invention.

Next, a head-mounted display in a fifth embodiment of the invention will be described with reference to drawings. FIG. 13 is a block diagram showing the configuration of the head-mounted display of the fifth embodiment. In the figure, a head tracker 130 constitutes a head detecting means for detecting the position and orientation of a viewer's head, and for outputting a head information signal h1 representing its absolute position and absolute orientation. A signal separation circuit 131 is a circuit for separating the head information signal h1 into a head position signal h11 and a head orientation signal h12. A movement translation circuit 132 constitutes a head information translating means for accepting at its input the head orientation signal h12 output from the signal separation circuit 131, and for translating it into a translated head information signal in accordance with a movement control signal output from a movement control circuit 134.

An eye tracker 133 constitutes a line-of-sight detecting means for detecting the direction of the viewer's line of sight, and for outputting a line-of-sight information signal e representing its absolute direction. The movement control circuit 134 constitutes a head information control means for accepting the head orientation signal h12 and the line-of-sight information signal e at its inputs, and for generating a movement control signal g. A subtractor 135 is a circuit for subtracting the translated head information signal output from the movement translation circuit 132, from the head orientation signal output from the signal separation circuit 131. An error compensating circuit 136 constitutes an error compensating means for accumulating error signals output from the subtractor 135, and for outputting an error compensating signal in accordance with the movement control signal. An adder 137 is an adding means for adding the output signal of the error compensating circuit 136 to the output signal of the movement translation circuit 132.

A signal combining circuit 138 is a circuit for combining the output signal of the adder 137 with the head position signal output from the signal separation circuit 131. An image generating circuit 139 constitutes an image generating means for generating a VR image from the output signal of the signal combining circuit 138 and the line-of-sight signal e output from the eye tracker 133. An image display 140 is a device for displaying an image, output from the image generating circuit 139, in the goggles worn by the viewer. The external view of the head-mounted display is the same as that of the first embodiment.

The operation of the thus configured head-mounted display of the fifth embodiment will be described next. The head tracker 130 outputs the viewer's spatial position information (x-coordinate position, y-coordinate position, z-coordinate position) and spatial rotation information (x-axial rotation, y-axis rotation, z-axis rotation) as the head information signal h1. The operating principle of the head tracker 130 has already been described in detail in connection with the first embodiment, and therefore, explanation thereof will not be repeated here. The head information signal h1 is input to the signal separation circuit 131 which separates it into the head position signal h11 and head orientation signal h12. The head orientation signal h12 is supplied to the movement translation circuit 132 and the movement control circuit 134. The head orientation signal h12 input into the movement translation circuit 132 is delayed by a prescribed time, and the difference between it and the non-delayed head orientation signal h12 is calculated. The difference value is translated in accordance with the movement control signal and is output as the translated head information signal. On the other hand, the head position signal h11 from the signal separation circuit 131 is directly input to the signal combining circuit 138.

In the meantime, the eye tracker 133 outputs the line-of-sight signal e representing the viewer's line-of-sight information (line-of-sight angular movement along x-axis, line-of-sight angular movement along y-axis). The operating principle of the eye tracker 133 has already been described in detail in connection with the first embodiment, and therefore, explanation thereof will not be repeated here. The line-of-sight information signal e is input to the movement control circuit 134 to which the head orientation signal h12 is also input. The head orientation signal h12 input into the movement control circuit 134 is delayed by a prescribed time, and the difference between it and the non-delayed signal is calculated. The difference value thus calculated is translated into the amount of head rotation made during the prescribed time. Likewise, the line-of-sight information signal e is also translated into the amount of line-of-sight rotation made during the prescribed time. The subsequent calculation and translation operations will be described with reference to FIG. 14 by taking the amount of horizontal head and eye rotation as an example.

Figure 14:
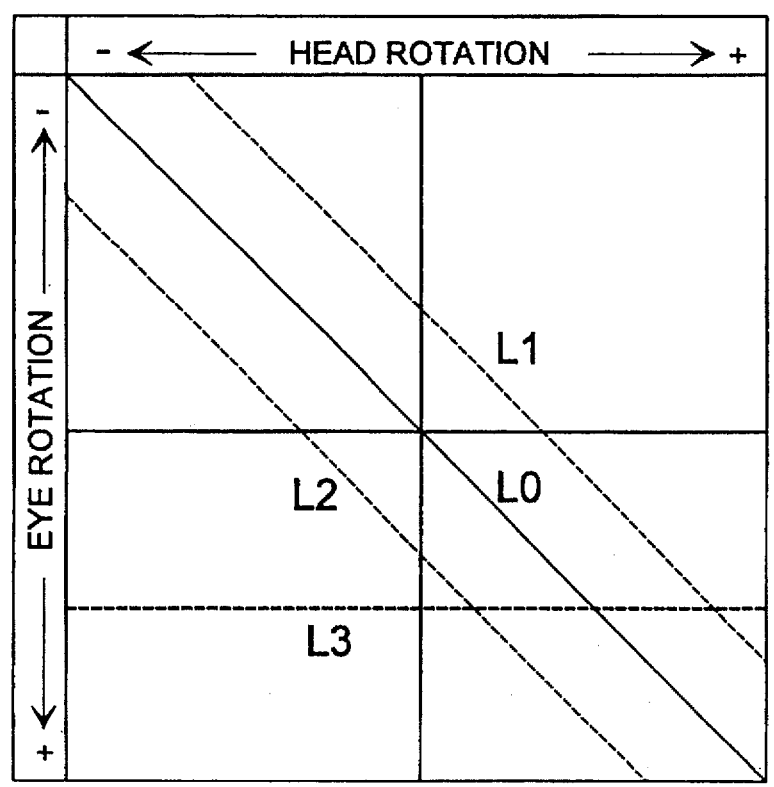
FIG. 14 is a diagram for explaining the function of a movement control circuit in the fourth embodiment.
Figure 15:
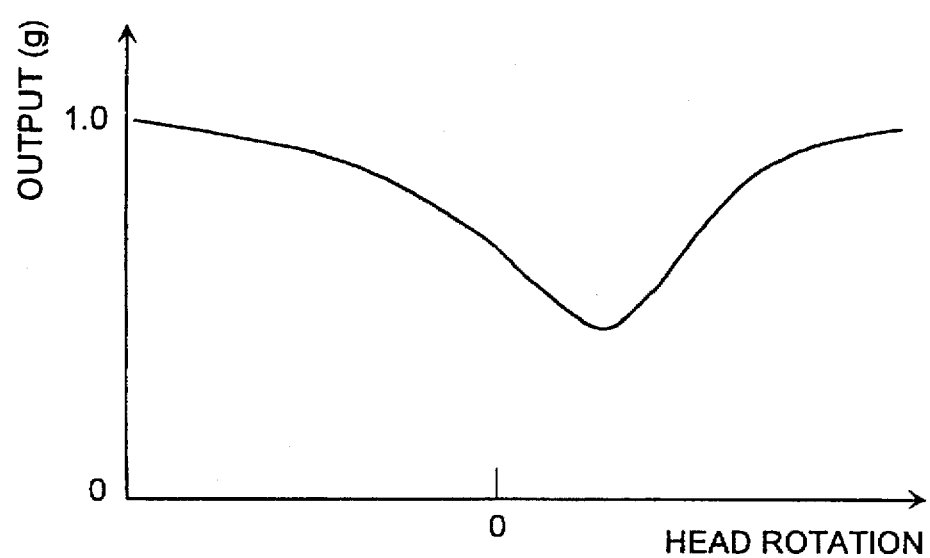
FIG. 15 is a diagram for explaining the function of the movement control circuit in the fourth embodiment.

In FIG. 14, the amount of horizontal head rotation represents the horizontal component of the amount of head rotation described above, and the amount of horizontal eye rotation represents the horizontal component of the amount of line-of-sight rotation described above. Line L0 in the figure is a boundary across which the amount of horizontal eye rotation and the amount of horizontal head rotation are of opposite sign, and lines L1 and L2 are lines having the same slope as Line L0, with a prescribed margin provided for the amount of horizontal head rotation and the amount of horizontal eye rotation. Dashed line L3 is a line along which the amount of horizontal eye rotation is at a prescribed negative value; the variation of the output value for the amount of horizontal head rotation at this time is shown in FIG. 15. As shown, the movement control circuit 134 generates an output value having a contour profile such that line L0 corresponds to a trough and lines L1 and L2 on both sides of line L0 each correspond to a plateau.

FIG. 15 shows the output value whose profile is cut along line L3. When both the amount of horizontal head rotation and the amount of horizontal eye rotation are somewhere between lines L1 and L2, the viewer is considered to be moving his head in the opposite direction to the direction of his line of sight while keeping his eyes on an object in the displayed image. In this case, the movement control circuit 134 outputs a signal g so generated as to suppress the amount of horizontal movement of the image, as shown in FIG. 15. In FIG. 15, point P1 is where lines L2 and L3 intersect. Point P2 is where lines L0 and L3 intersect, and point P3 is where lines L1 and L3 intersect. In this manner, the movement control circuit 134 outputs a low value near line L0. The amount of vertical movement is also suppressed in like manner.

The movement control signal g from the movement control circuit 134 is input to the movement translation circuit 132 where it is multiplied by the amount of head orientation movement output from the signal separation circuit 131. That is, when the viewer rotates his head in the opposite direction while focusing his attention on a point in the image, control is performed in such a manner as to suppress the amount of head rotation so that the attention point does not easily go outside the field of view.

The subtractor 135 calculates the difference value between the head orientation signal and the output signal of the movement translation circuit 132, and generates an error signal representing the difference between the translated head orientation signal and the actually measured head orientation signal. The error signal is supplied to the error compensating circuit 136 to which the movement control signal g from the movement control circuit 134, such as the one shown in FIG. 15, is also supplied. If the signal g is smaller than 1 by more than a certain degree, this means that the viewer is watching a particular image, in which case the generated error signal is accumulated in the error compensating circuit 136. If the value of g is close to 1, this means that the viewer is not watching any particular image, so that the error compensating circuit 136 outputs the sum of the accumulated error signals. With this processing, accumulated errors resulting from smoothing are corrected in a manner imperceptible to the viewer, while suppressing displacement from absolute coordinates as much as possible.

The adder 137 adds the error compensation signal to the translated head information signal h12' output from the movement translation circuit 132, thereby compensating for errors of the head orientation signal. The head position signal h11 output from the signal separation circuit 131 and the head orientation signal h12' output from the adder 137 are fed into the signal combining circuit 138 which generates a head information signal h2. The head information signal h2 is supplied to the image generating circuit 139 where a VR image signal based on the head information signal h2 is generated. The VR image is displayed on the image display 140. The image generating circuit 139 is also supplied with the line-of-sight information signal e, which may be combined to generate the image. It will also be recognized that the movement control circuit 134 may be implemented using a ROM where values are stored in advance.

Furthermore, the movement control circuit 134 may be constructed to output the movement control signal g by utilizing, for example, the characteristics of eyeball movement. The following description deals with an example in which the gain of vestibulo-ocular reflex (VOR), an eyeball movement characteristic, is used to accomplish the purpose.

The movement control circuit 134 has a memory in which a VOR gain in stationary state is stored; that is, at the start of viewing, a specific image is displayed to measure the viewer's VOR gain (V1) in stationary state for storage in the memory. During viewing, a specific image is displayed to measure the viewer's VOR gain (V2) at regular intervals. Then, the difference between the VOR gain thus measured and the VOR gain in stationary state is calculated as V1−V2=V. Based on this difference V, the gain of the output value shown in FIG. 15 is varied. For example, if V is close to 0, an output such as shown in FIG. 15 is produced. If V has a positive sign, then an output is produced by multiplying the output value shown in FIG. 15 by a coefficient greater than 1, the magnitude of the coefficient being made proportional to the value of V. If V has a negative sign, an output is produced by multiplying the output value shown in FIG. 15 by a coefficient greater than 0 and smaller than 1. Control is thus performed to always bring the viewer's VOR gain to the stationary state gain.

Figure 16:
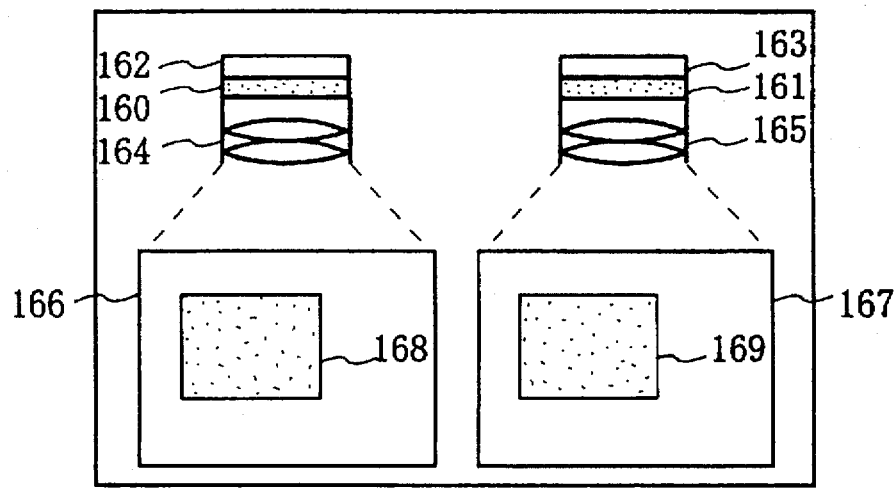
FIG. 16 is an external view of a head-mounted display according to a sixth embodiment of the invention.

A sixth embodiment of the present invention will be described below with reference to drawings. FIG. 16 shows an external view of the head-mounted display according to the sixth embodiment of the invention: 160 and 161 are liquid-crystal panels for displaying images, one for each eye; 162 and 163 are backlights for the liquid-crystal panels 160 and 161, respectively; 164 and 165 are projection lenses for projecting the images displayed on the respective liquid-crystal panels 160 and 161 by enlarging them by prescribed times; 166 and 167 are half-silvered mirrors for reflecting the images that were projected from the liquid-crystal panels 160 and 161 through the projection lenses 164 and 165; and 168 and 169 are reflected images of the images displayed on the respective liquid-crystal panels 160 and 161.

Figure 17:
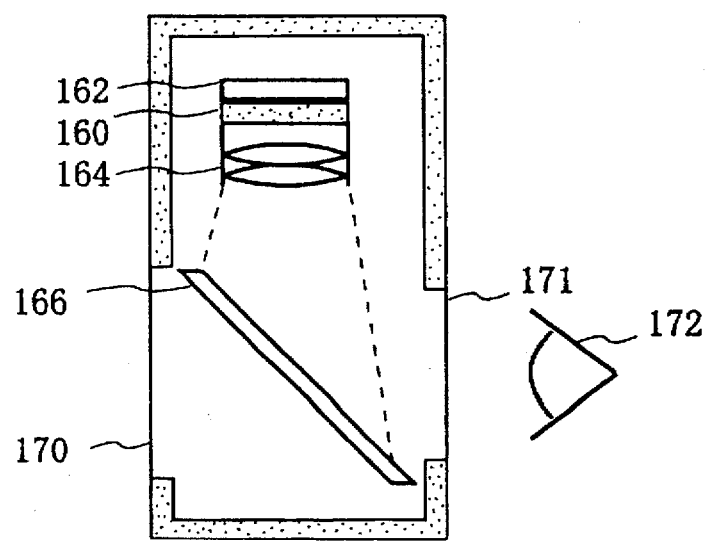
FIG. 17 is a cross-sectional view of the head-mounted display according to the sixth embodiment.

FIG. 17 is a side view showing the construction of FIG. 16 in cross section. Components designated by the same reference numerals as those in FIG. 16 have the same functions. In FIG. 17, 170 is an external window for admitting light from the outside, 171 is a viewing window through which a viewer views, and 172 is an eye of the viewer.

In the thus constructed head-mounted display of the invention, if an image is displayed on the entire surface of each of the liquid-crystal panels 160 and 161, as shown in FIG. 18(a), the displayed images are reflected by the entire surfaces of the respective half-silvered mirrors 166 and 167. However, in usual applications of the invention, a reduced image is displayed on a portion of each of the liquid-crystal panels 160 and 161, with the surrounding area darkened, as shown in FIG. 18(b). Such images are reflected by the respective half-silvered mirrors, as shown by reference numerals 168 and 169 in FIG. 16.

Portions of the half-silvered mirrors 166 and 167 where images are not reflected transmit outside light so that the outside light and the images displayed on the liquid-crystal panels 160 and 161 are optically combined for viewing.

Figure 19:
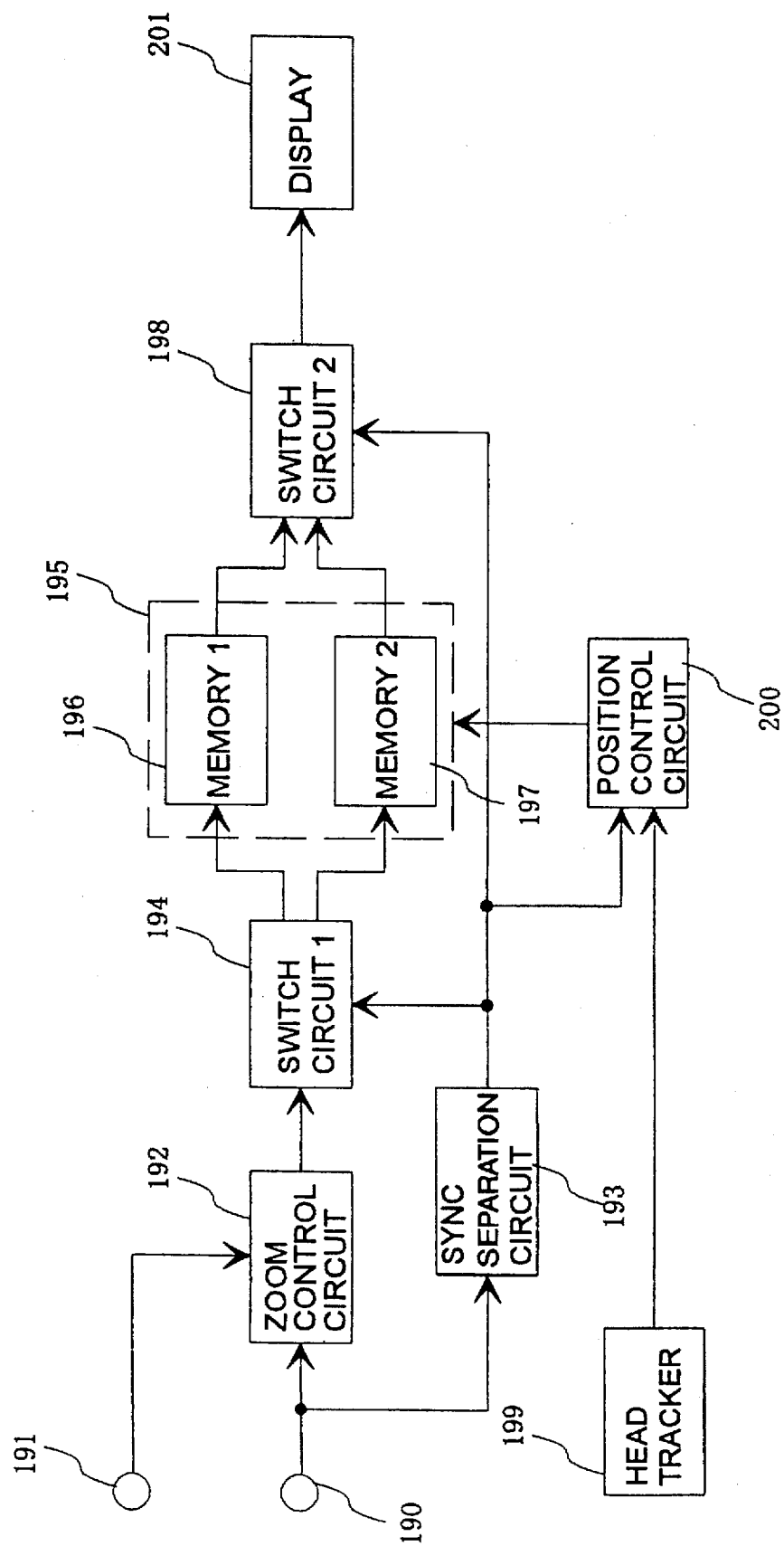
FIG. 19 is a block diagram showing the general configuration of the sixth embodiment.

FIG. 19 is a block diagram showing the head-mounted display according to the sixth embodiment of the invention. In the figure, 190 is a video signal input terminal; 191 is a zoom control terminal via which a signal for adjusting the magnification of an image for display is input; 192 to 198 constitute video control circuitry for controlling the size and position of the image to be displayed, wherein 192 is a zoom control circuit for adjusting the display magnification of the input video signal in accordance with an input applied via the zoom control terminal, 193 is a sync separation circuit for separating a vertical sync signal from the input video signal, 194 is a switch circuit 1 for switching the output of the zoom control circuit 192 in accordance with the output signal of the sync separation circuit 193, 195 is a memory circuit comprising a memory 1, 196, and memory 2, 197, for temporarily storing output signals of the zoom control circuit 192, and 198 is a switch circuit 2 for switching its input from the memory circuit 195 in accordance with the output signal of the sync separation circuit 193; 199 is a head tracker for detecting the position and orientation of a viewer's head; 200 is a display position control circuit for outputting a read address for reading the memory circuit 195 in accordance with an output of the head tracker 199; and 201 is a display for displaying an image output from the memory circuit 195.

The operation of the thus configured head-mounted display of the invention will be described next. When a video signal is input via the video signal input terminal 190, the zoom control circuit 192 performs decimation and interpolation on the input video signal and changes the viewing angle in accordance with the signal input via the zoom control terminal 191. A desired display magnification can be input via the zoom control terminal 191; when a certain display magnification is input, an output image such as shown in FIG. 18(b) is obtained from the input image shown in FIG. 18(a). At this time, the area surrounding the reduced image is displayed as a black area.

The input video image is also supplied to the sync separation circuit 193 where the vertical sync signal is separated. The switch circuit 1 switches the output of the zoom control circuit 192 in accordance with the vertical sync signal. The switch circuit 1 is coupled to the memory 1 and memory 2 in the memory circuit 195, and the output signal of the zoom control circuit 192 for each field is stored in the memory 1 and memory 2 in turn.

The head tracker 199 outputs information representing the viewer's head position and head orientation. The head tracker is constructed using, for example, a magnetic sensor similar to the one shown in FIG. 20. In FIG. 20, 202 is a source coil for generating a magnetic field in space, 203 is a sensor coil for detecting changes in the magnetic field, and 204 is a controller for sending a current to the source coil 202, and for detecting a current being sent from the sensor coil 203 and outputting the result as a head position/orientation signal. The sensor coil is attached to the head-mounted display, and the controller outputs the head position/orientation signal to match the movement of the viewer's head.

The display position control circuit 200 is supplied with the output signal of the head tracker 199 and the output signal of the sync separation circuit 193, and outputs an address signal indicating the location from which an image signal stored in the memory circuit 195 is to be read. In accordance with this read address signal, an image signal stored in the memory circuit 195 is read and is directed through the switch circuit 2 for display on the display 201.

For example, when the switch circuit 1 is connected to the memory 1 by the application of a vertical sync signal, the switch circuit 2 is connected to the memory 2, and upon the application of the vertical sync signal, the display position control circuit 200 outputs the read address to read the memory 2, causing the image signal stored in the memory 2 to be output through the switch circuit 2. That is, the memory 1 and memory 2 are switched between writing and reading in turn by the application of a vertical sync signal.

Referring to FIGS. 21 and 22, we will describe how the display position control circuit 200 controls the display position. FIG. 21 is a schematic diagram showing how an output signal of the zoom control circuit 192 is stored in memory. This schematic diagram shows the contents of the memory 2 when the switch circuit 1 is connected to the memory 1, or the contents of the memory 1 when the switch circuit 1 is connected to the memory 2. Reference numeral 210 is the memory, 211 is the reduced input image, 212 is the black area added in the zoom control circuit 192, 213 is a target object in the input image, and 214 is the background against which the object is placed. A to F indicate read address locations.

The memory read address is controlled based on the viewer's head position and orientation; for example, when the viewer is facing the front, an address signal indicating location A in FIG. 21 is output from the display position control circuit 200. When the viewer rotates his head by certain degrees to the left as he faces the front, an address signal indicating location E in FIG. 21 is output. Referring to FIG. 22, we will describe how the displayed image changes at this time.

Figure 22A:
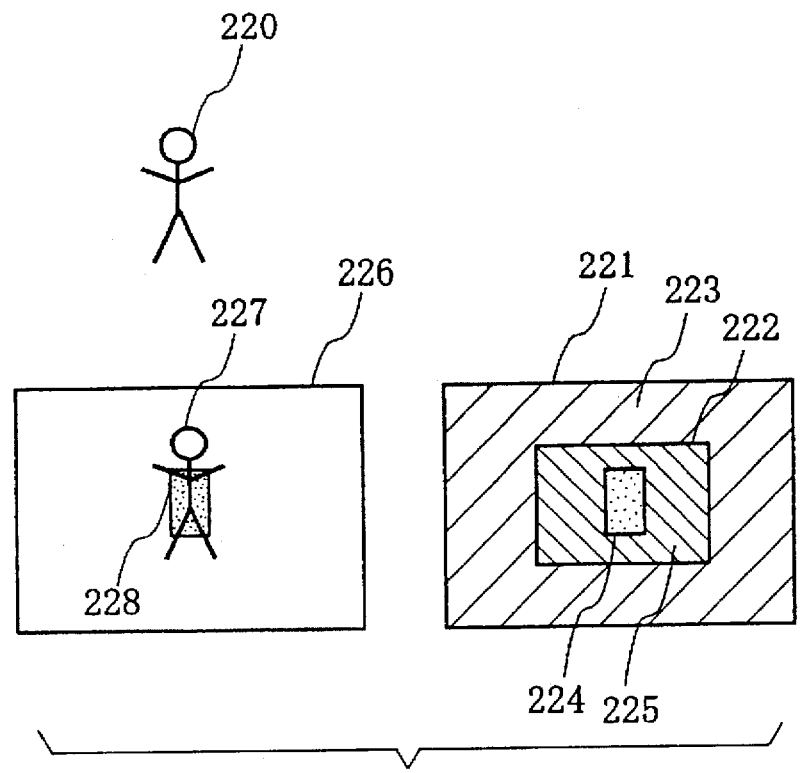
FIGS. 22(a) and 22(b) are diagrams for explaining the operation of the head-mounted display according to the sixth embodiment.

FIG. 22(a) shows the displayed image when the viewer is facing the front; 220 is a human located in the forward direction of the viewer, and 221 is the liquid-crystal panel 160 shown in FIG. 16 when an image is displayed by reading the contents of the memory 210 from address A. Reference numerals 222 to 225 correspond to 211 to 214 in FIG. 21: 222 is the black area added in the zoom control circuit 192; 223 is the input image reduced by the zoom control circuit 192; 224 is a target object, such as clothing, which is to be overlaid onto the human 220; 225 is the background of the input image; 226 is the half-silvered mirror shown in FIG. 16; 227 is an image of the human 220 transmitted through the half-silvered mirror; and 228 is an image of the object 224 reflected by the half-silvered mirror.

Figure 22B:
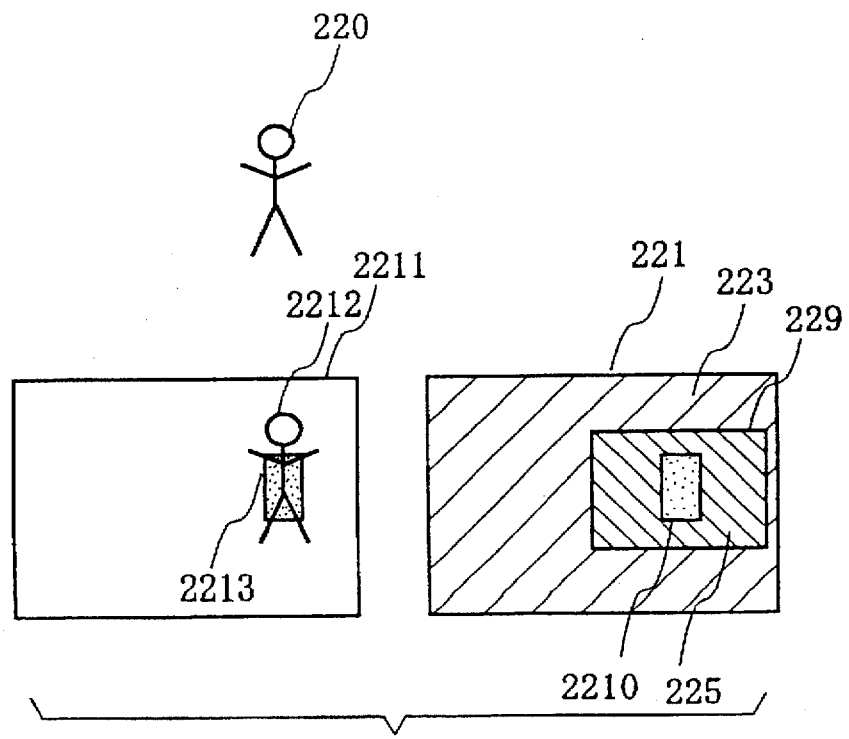

FIG. 22(b) shows the displayed image when the viewer has rotated his head to the left as he faces the front. The image shown is read from address E in FIG. 21, and components designated by the same reference numerals as those in FIG. 22(a) have the same functions. Reference numeral 229 is the input image shifted to the right on the liquid-crystal panel, 2210 is the target object in the input image, 2211 is the half-silvered mirror, 2212 is an image of the human 220 transmitted through the half-silvered mirror 2211, and 2213 is an image of the target object 2210 reflected by the half-silvered mirror.

When the viewer is facing the front, that is, in the case of FIG. 22(a), the human 220 located in the forward direction of the viewer can be viewed in the forward direction 227 through the half-silvered mirror. Next, when the background 225 of the input image displayed on the liquid-crystal panel 221 is, for example, black, only the object image 224 is reflected by the half-silvered mirror 226. In this condition, the viewer can view an image created by overlaying the reflected image 228 of the object image 224 onto the transmitted image 227 of the human 220 located in front.

Next, when the viewer has rotated his head to the left and come to rest, that is, in the case of FIG. 22(b), this means that the human 220 has moved to the right relative to the viewer, and the human image 2212 can be viewed in the right side of the half-silvered mirror 2211. On the other hand, the input image displayed on the liquid-crystal panel is shifted to the right to match the amount of head rotation. That is, in FIG. 21, when the viewer is facing the front according to the output of the head tracker, read address A is output, and when the viewer rotates his head to the left, the read address changes successively from A to F to E to D to match the angle of rotation. With this change of the read address, the image 229 on the liquid-crystal panel is shifted to the right to match the amount of head rotation. Since the shift amount corresponds to the amount of head rotation, the viewer can view the reflected image of the object 2210 at position 2213, enabling the viewer to view the object overlaid on the human 220 even when the viewer has rotated his head.

The output range of the display position control circuit 200 is set so that the input image 229 does not run over the edges of the liquid-crystal panel 221 in FIG. 22. More specifically, when the input image 229 is at the left edge of the liquid-crystal panel, the read address is C in FIG. 21, and when it is in the center, the read address is A or F in FIG. 21. When it is at the right edge, the read address is D in FIG. 21. That is, the output is produced within the range of C →B →A(F) →E →D. More specifically, when the viewer rotates his head by large degrees to the left, the read address changes from F to E to D in this order, the address remaining at D if the head is rotated further to the left. Similar processing is performed when the viewer's head is rotated in vertical directions.

With the address signal output from the display position control circuit 200 in the above manner, the switch circuit 2 outputs a properly overlaid image for display despite the movement of the viewer's head.

In the above example, the output range of the display position control circuit 200 is set within the range of C to D (with A at the center) in FIG. 21. However, when the viewer's head is rotated to the left, for example, if it is desired to shift the input image 229 in FIG. 22 to the right beyond the display range of the liquid-crystal panel 221, the address signal output from the display position control circuit may be set at a location beyond D in FIG. 21. However, in this case, the portion of the displayed image lying off the right edge of the liquid-crystal panel will appear from the left edge; therefore, this portion must be erased. This can be accomplished by providing a switch circuit in the memory circuit 195 and by darkening the image being displayed from the left edge.

The head tracker has been described as comprising a magnetic sensor, but it will be appreciated that ultrasonic or other types of sensors may be used; even gyrosensors or the like may also be used.

In FIG. 22 illustrating the present embodiment, the areas other than the target object in the input image have been described as being displayed as black areas, but these areas may be displayed using other brightness levels. This can be accomplished by having the backlights 162 and 163 in FIG. 16 illuminate only the target object 224 in FIG. 22. When the backlights 162 and 163 are constructed using a surface-area light source, if a light blocking liquid-crystal panel is provided between the backlight and the liquid-crystal panel in a sandwiched manner, only the target object 224 can be illuminated by controlling the light-blocking liquid-crystal panel in accordance with the output of the display position control circuit 200.

In the display position control circuit 200 of the present embodiment, the display position is determined based on the output of the head tracker, but if a configuration such as shown in FIG. 7 or 11 is incorporated, as described in detail in connection with the second and fourth embodiments, control can be performed while suppressing the minute shaking of the viewer's head. Furthermore, if a sensor is provided for detecting the viewer's line of sight, and a configuration such as shown in FIG. 3 or 9 is incorporated, as described in detail in connection with the first and third embodiments, control can be performed while suppressing minute shaking of the viewer's head.

Figure 23:
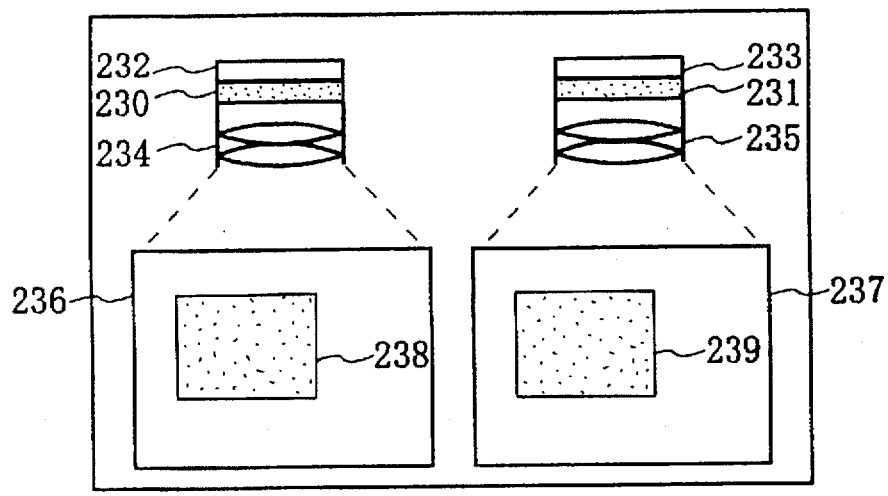
FIG. 23 is an external view of a head-mounted display according to a seventh embodiment of the invention.

A seventh embodiment of the invention will be described below with reference to drawings. FIG. 23 shows an external view of the head-mounted display according to the seventh embodiment of the invention: 230 and 231 are liquid-crystal panels for displaying images, one for each eye; 232 and 233 are backlights for the liquid-crystal panels 230 and 231, respectively; 234 and 235 are projection lenses for projecting the images displayed on the respective liquid-crystal panels 230 and 231 by enlarging them by prescribed times; 236 and 237 are reflective/transmissive panels each constructed from a glass and a monochrome liquid-crystal panel attached back-to-back; and 238 and 239 are reflected images of the images displayed on the liquid-crystal panels 230 and 231.

Figure 24:
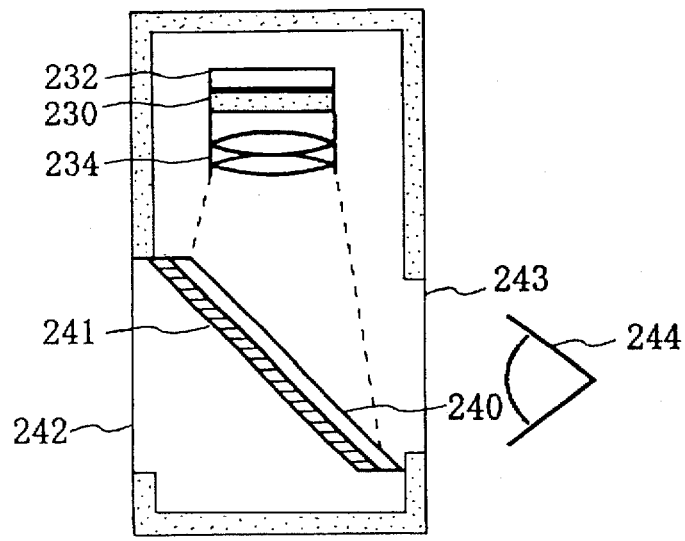
FIG. 24 is a cross-sectional view of the head-mounted display according to the seventh embodiment.

FIG. 24 is a side view showing the construction of FIG. 23 in cross section. Components designated by the same reference numerals as those shown in FIG. 23 have the same functions, wherein 240 is a glass plate, 241 is a monochrome liquid-crystal panel, 242 is an external window for admitting outside light, 243 is a viewing window through which a viewer views, and 244 is an eye of the viewer.

In the thus constructed head-mounted display of the invention, when a reduced image is displayed on a portion of each of the liquid-crystal panels 230 and 231, the images are projected onto the areas 238 and 239 of the reflective/transmissive panels 236 and 237 by means of the backlights 232 and 233 and projection lenses 234 and 235. The operation of the monochrome liquid-crystal panel in FIG. 24 will be described next. Suppose that, in the ON state, the liquid-crystal panel 241 transmits light, and in the OFF state, blocks light. When the liquid-crystal panel 241 is OFF over its entire surface, the viewer can view the outside light entering through the external window 242. When the liquid-crystal panel is ON over its entire surface, the viewer can view the image displayed on the liquid-crystal panel 230 and reflected by the glass plate 240. If the monochrome liquid-crystal panels are set ON only in the areas 238 and 239 in FIG. 23 and OFF in their surrounding areas, the viewer can view the images displayed on the liquid-crystal panels 230 and 231 and the outside light at the same time. This will be described in further detail below.

Figure 25:
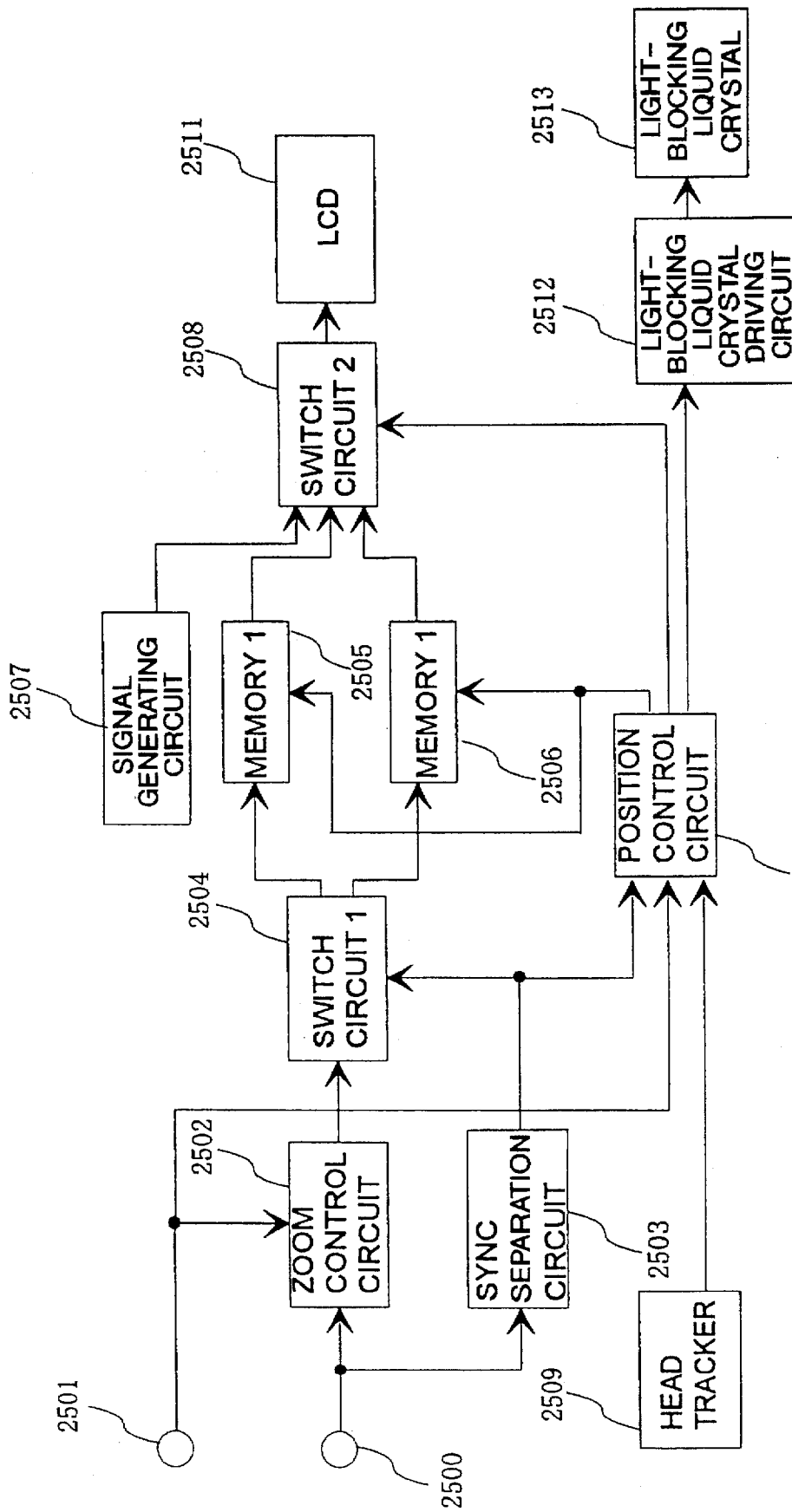
FIG. 25 is a block diagram showing the general configuration of a head-mounted display according to the seventh embodiment.

FIG. 25 is a block diagram showing the seventh embodiment of the invention. In FIG. 25, 2500 is a video signal input terminal via which a video signal is input; 2501 is a zoom control terminal via which a signal for adjusting the magnification of an image for display is input; 2502 to 2508 constitute video control circuitry for controlling the size and position of the image to be displayed, wherein 2502 is a zoom control circuit for adjusting the display magnification of the input video signal in accordance with an input applied via the zoom control terminal, 2503 is a sync separation circuit for separating a vertical sync signal from the input video signal, 2504 is a switch circuit 1 for switching the output of the zoom control circuit 2502 in accordance with the output signal of the sync separation circuit 2503, 2505 and 2506 are memory 1 and memory 2, respectively, for storing an output signal of the zoom control circuit 2502 by being switched in by the switch circuit 1, 2507 is a signal generating circuit for outputting a black level signal, and 2508 is a switch circuit 2 for switching its input among the memory 1, the memory 2, and the signal generating circuit; 2509 is a head tracker for detecting the position and orientation of a viewer's head, and for outputting the result as a head information signal; 2510 is a display position control circuit for determining the position at which to display an image, on the basis of the head information signal, the output signal of the sync separation circuit 2502, and the input supplied via the zoom control terminal 2501, and for outputting a memory read address, a control signal for switching the switch circuit 2, and a display position information signal; 2511 is a liquid-crystal display panel for displaying an output of the switch circuit 2; 2512 is a light-blocking liquid crystal driving circuit for driving a light-blocking liquid-crystal panel in accordance with the display position information signal; and 2513 is the light-blocking liquid-crystal panel constructed from a monochrome liquid-crystal panel.

The operation of the thus configured seventh embodiment of the invention will be described next. When a video signal is input via the video signal input terminal 2500, the zoom control circuit 2502 reduces the image in accordance with the signal input via the zoom control terminal 2501, in the same manner as described in connection with the sixth embodiment. On the other hand, the sync separation circuit 2503 separates from the input signal a vertical sync signal which is output. The sync signal is applied to the switch circuit 1 indicated at 2504, which, with each application of the sync signal, switches the output of the zoom control circuit 2502 between the memory 1 and memory 2. That is, the reduced signal is stored in the memory 1 and memory 2 in turn on a frame-by-frame basis.

The head tracker 2509 detects the viewer's head position and orientation. This operation has already been described in detail in connection with the sixth embodiment, and therefore, explanation thereof will not be repeated here. The output of the head tracker 2509 and the output of the sync separation circuit 2503 are supplied to the display position control circuit 2510 which then produces three outputs to control the display position. The first output is an address signal that is sent to the memory 1 and memory 2 and that carries an address with which to read a signal stored in the memory 1 and memory 2. The second output is a switch control signal which is coupled to the switch circuit 2, indicated at 2508, for switching its input among the memory 1, the memory 2, and the signal generating circuit 2507. The third output is a display position information signal which is supplied to the light-blocking liquid crystal driving circuit 2512. These signals will be described in more detail with reference to FIG. 26.

Figure 26:
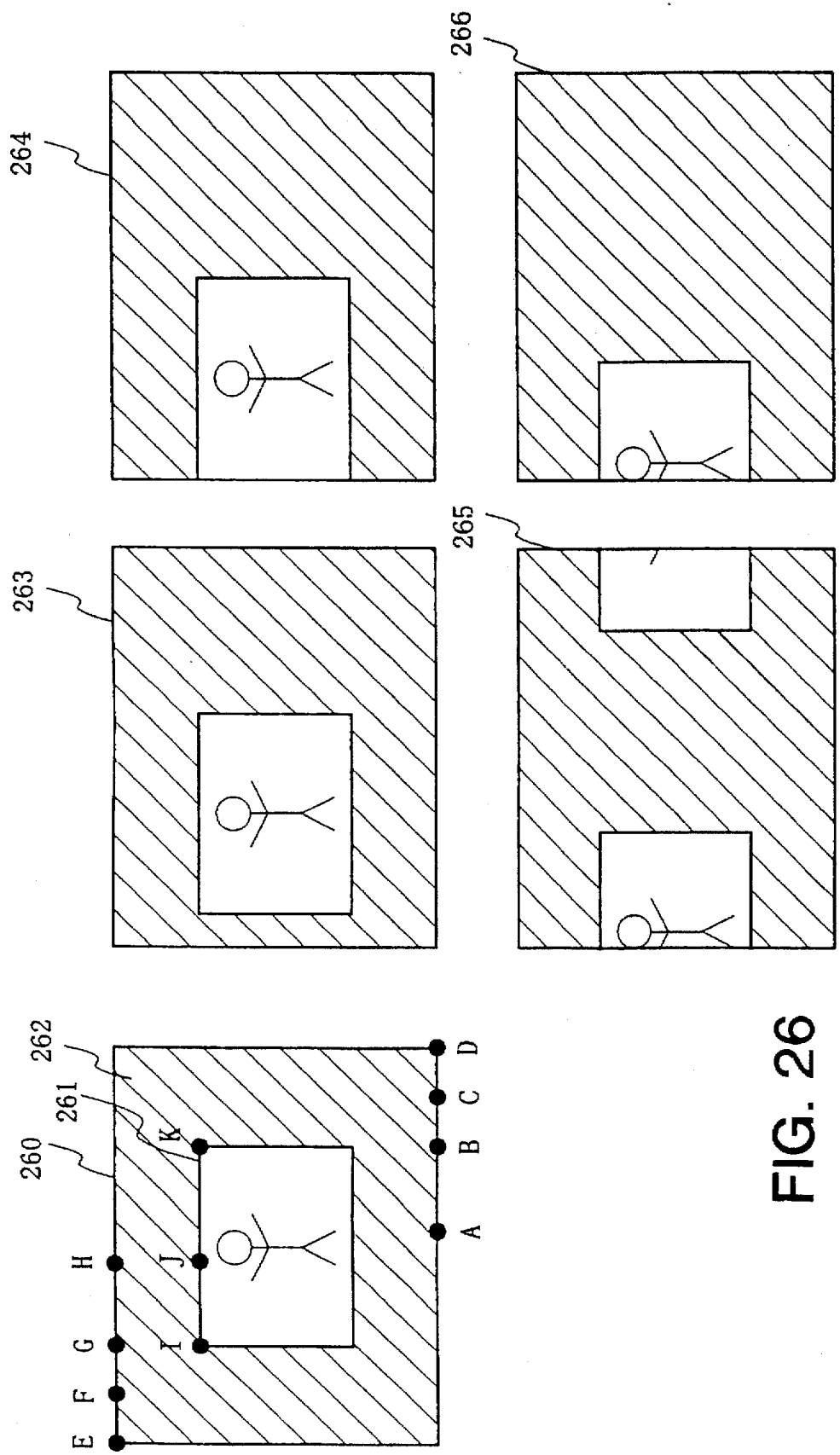
FIG. 26 is a diagram for explaining the operation of the head-mounted display according to the seventh embodiment.

In FIG. 26, 260 is a schematic view showing memory contents, wherein 261 is an input signal that was reduced by the zoom control circuit 2503, and 262 is an area that was filled in with black by the zoom control circuit 2503. A to K indicate read address locations. The address signal to be output from the display position control circuit 2510 changes in accordance with the output of the head tracker 2509; that is, the read address changes from E to F to G to H in FIG. 26 as the viewer turns his head from the forward direction toward the right, and changes from D to C to B to A as the viewer turns his head from the forward direction toward the left. Reference numerals 263 to 265 are schematic diagrams showing how the displayed image changes as the viewer turns his head toward the right; 263 shows the image when the read address is F, 264 for G, and 265 for H. When the read address is F, the initial read start address is F, and thereafter, reading is done in a sequential manner, shifting the displayed image to the left as shown in 263. The same also applies when the read address is G. However, when the viewer has rotates his head further to the right, that is, when the read address has proceeded to H, the display image is not only shifted to the left, but an unwanted image appears from the right edge, as shown in 265. Therefore, when the read address in terms of horizontal location is at an intermediate point along the input image in the memory 260, such as address A or H, there arises the need to erase the unwanted image.

Whether the address output from the display position control circuit 2510 is at an intermediate point along the input image is determined by the amount of change of the magnification of the input image. The display position control circuit 2510, based on the input applied via the zoom control terminal, determines whether or not the output address is at an intermediate point along the image, and outputs a signal for switching the switch circuit 2. For example, when the read address location is H, reading starts from H and proceeds in the scanning direction, until reaching address I starting at which data of the input signal 261 is stored. If reading is to be performed line by line starting from H, the input image data is first read from I to J. The reading of data located from I to J will result in the formation of an image at the right edge of 265. Therefore, when the data from I to J is being read out, the switch circuit 2 is made to switch its input to the signal generating circuit 2507. Since the signal generating circuit 2507 is constantly generating a black level signal, the resulting output image will be as shown in 266. This image is displayed on the liquid-crystal display 2511. The above has described the processing performed in the horizontal direction as an example. Similar processing is performed in the vertical direction.

Next, the display position information signal is input from the display position control circuit 2510 to the light-blocking liquid crystal driving circuit. This signal concerns the information of the area displayed on the liquid-crystal display 2511, as explained with reference to FIG. 26. Based on the display position information signal, the light-blocking liquid crystal driving circuit 2512 activates light-blocking liquid crystals only for the area displayed on the liquid-crystal display.

In the present embodiment, the image in the right side of 265 in FIG. 26 is erased by using the signal generating circuit 2507 shown in FIG. 25, but this can also be accomplished by having the backlights 232 and 233 partially illuminate, as described in connection with the sixth embodiment.

In the display position control circuit 200 of the present embodiment, the display position is determined based on the output of the head tracker, but if a configuration such as shown in FIG. 7 or 11 is incorporated, as described in detail in connection with the second and fourth embodiments, control can be performed while suppressing the minute shaking of the viewer's head. Furthermore, if a sensor is provided for detecting the viewer's line of sight, and a configuration such as shown in FIG. 3 or 9 is incorporated, as described in detail in connection with the first and third embodiments, control can be performed while suppressing the minute shaking of the viewer's head. The configuration shown in FIG. 13, described in detail in connection with the fifth embodiment, may also be incorporated.

Figure 27:
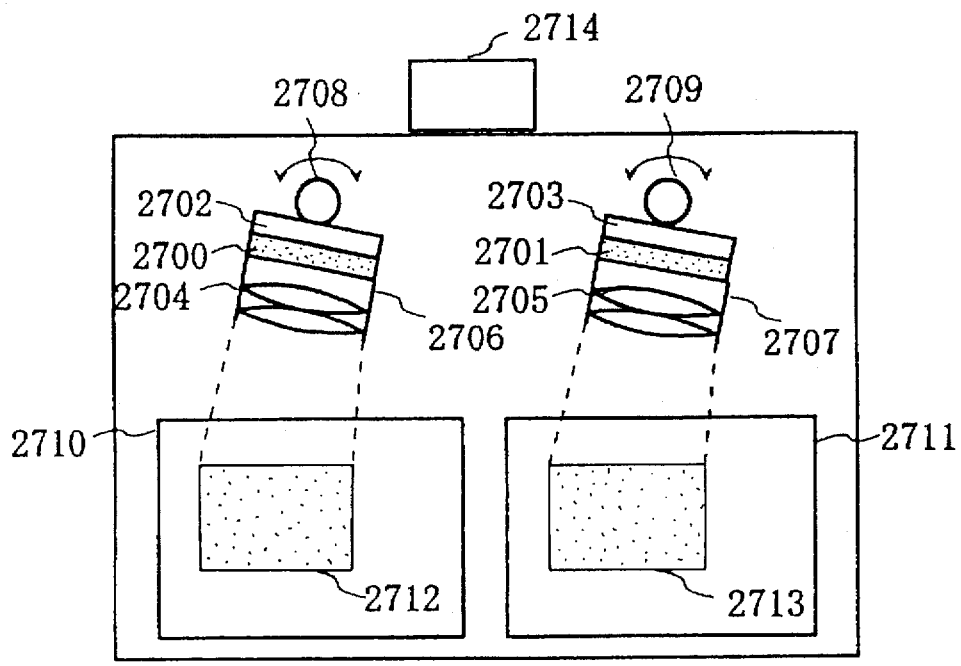
FIG. 27 is an external view of a head-mounted display according to eighth and ninth embodiments of the invention.

An eighth embodiment of the invention will be described below with reference to drawings. FIG. 27 shows an external view of the head-mounted display according to the eighth embodiment of the invention: 2700 and 2701 are liquid-crystal panels for displaying images, one for each eye; 2702 and 2703 are backlights for the liquid-crystal panels 2700 and 2701, respectively; 2704 and 2705 are projection lenses for projecting the images displayed on the respective liquid-crystal panels 2700 and 2701 by enlarging them by prescribed times; 2706 and 2707 are projection units each consisting of the liquid-crystal panel and the backlight molded in integral fashion; 2708 and 2709 are drives for driving the projection units 2706 and 2707 back and forth and right and left; 2710 and 2711 are half-silvered mirrors for reflecting images projected from the liquid-crystal panels 2700 and 2701 through the projection lenses 2704 and 2705; 2712 and 2713 are reflected images of the images displayed on the liquid-crystal panels 2700 and 2701; and 2714 is a head tracker for detecting the position and orientation of a viewer's head.

Figure 28:
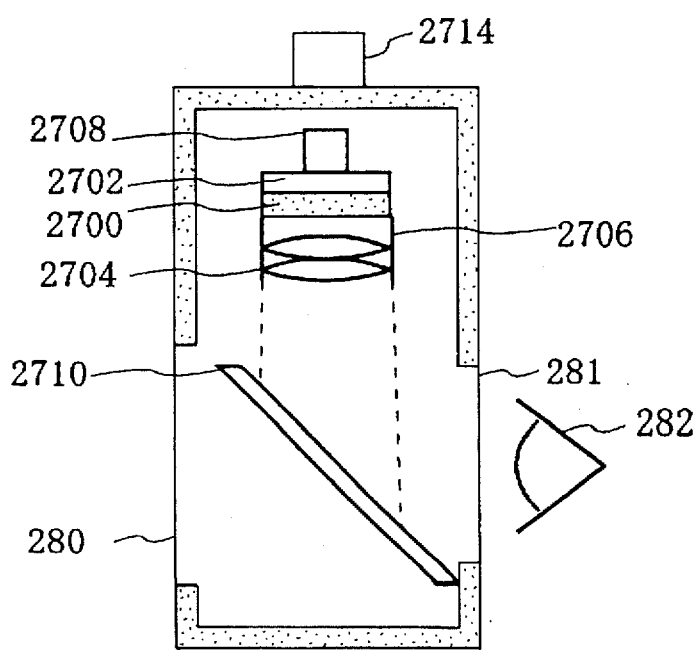
FIG. 28 is a cross-sectional view of the head-mounted display according to the eighth embodiment.

FIG. 28 is a side view showing the construction of FIG. 27 in cross section. Components designated by the same reference numerals as those shown in FIG. 27 have the same functions. In FIG. 28, 280 is an external window for admitting outside light, 281 is a viewing window through which a viewer views, and 282 is an eye of the viewer.

The operation of the thus constructed head-mounted display according to the eighth embodiment of the invention will be described next. When a video signal is input, images are displayed on the liquid-crystal panels 2700 and 2701. The head-mounted display is equipped with a zoom adjusting terminal. In accordance with an input applied at the zoom adjusting terminal, the viewing angle of the reflected images 2712 and 2713 on the half-silvered mirrors are adjusted for display. That is, in accordance with an input applied at the zoom adjusting terminal, the zoom factor of the projection lenses 2704 and 2705 is changed to change the size of the reflected images 2712 and 2713.

Figure 29:
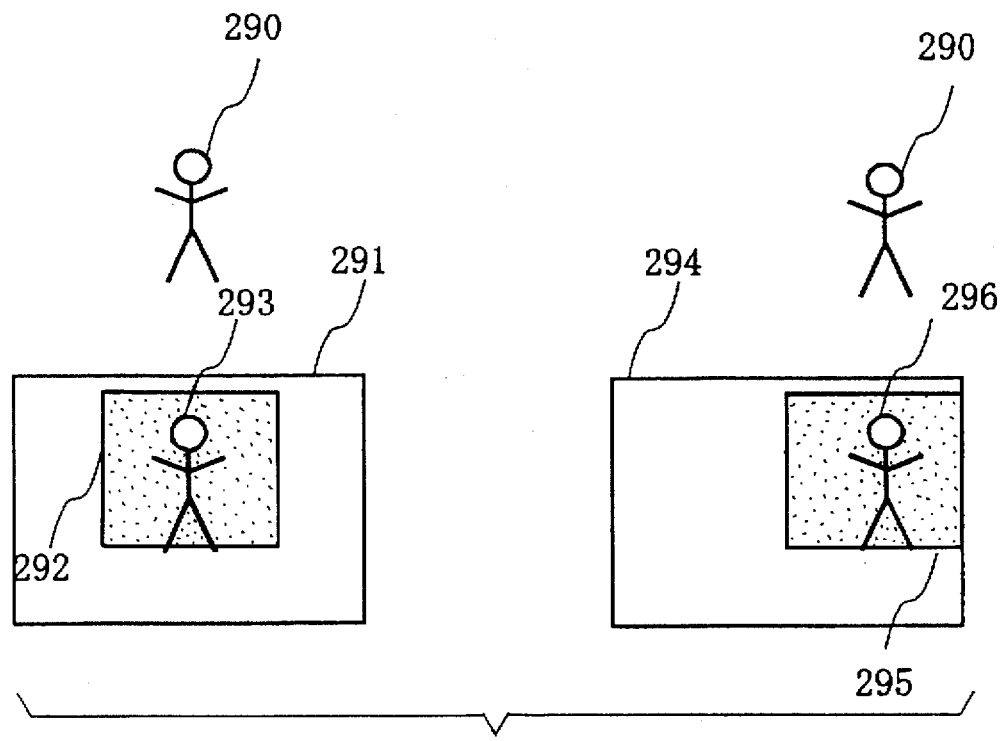
FIG. 29 is a diagram for explaining the operation of the head-mounted display according to the eighth embodiment.

The head-mounted display is also equipped with the head tracker 2714 for detecting the position and orientation of the viewer's head. The head tracker 2714 has already been described in detail in connection with the first embodiment, and therefore, explanation thereof will not be repeated here. In accordance with the output of the head tracker 2714, the drives 2708 and 2709 drive the projection units 2706 and 2707 backward or forward and rightward or leftward. This causes the reflected images 2712 and 2713 on the half-silvered mirrors 2710 and 2711 to be shifted in vertical and horizontal directions. This operation will be described with reference to FIG. 29.

FIG. 29(a) is a diagram schematically showing images transmitted through or reflected by the half-silvered mirror 2710 when the viewer is facing the front, wherein 290 is a human located in the forward direction of the viewer, 291 is the half-silvered mirror designated by 2710 in FIG. 27, 292 is the reflected image designated by 2712 in FIG. 27 of the liquid-crystal panel, and 293 is the transmitted image of the human 290. In this way, with the half-silvered mirror, the viewer is viewing an outside light image overlaid on the image displayed on the liquid-crystal panel. FIG. 29(b) shows the display when the viewer has rotated his head slightly to the left. In FIG. 29(b), 294 is the half-silvered mirror, 295 is the reflected image designated by 2712 in FIG. 27 of the liquid-crystal panel, and 296 is the transmitted image of the human 290. When the viewer rotates his head slightly to the left, the human image 296 on the half-silvered mirror moves to the right relative to the viewer, since the human 290 in the outside world remains stationary. At the same time, the head tracker 2714 outputs the leftward rotation angle of the viewer's head to the drive 2708. The drive 2708 then drives the projection unit toward the right, as viewed from the viewer, so that the reflected image on the half-silvered mirror is moved by an amount that matches the amount of head rotation. This allows the viewer to view the human image 296 properly overlaid on the image 295 displayed on the liquid-crystal panel, even when the viewer has rotated his head. The same operation is also performed by the drive 2709. Similar operations are performed when the viewer's head is rotated in vertical directions or when the head is moved upward, downward, rightward, or leftward, to present a properly overlaid image.

In the present embodiment, the display position is determined based on the output of the head tracker, but if a configuration such as shown in FIG. 7 or 11 is incorporated, as described in detail in connection with the second and fourth embodiments, control can be performed while suppressing the minute shaking of the viewer's head. Furthermore, if a sensor is provided for detecting the viewer's line of sight, and a configuration such as shown in FIG. 3 or 9 is incorporated, as described in detail in connection with the first and third embodiments, control can be performed while suppressing the minute shaking of the viewer's head.

Figure 30:
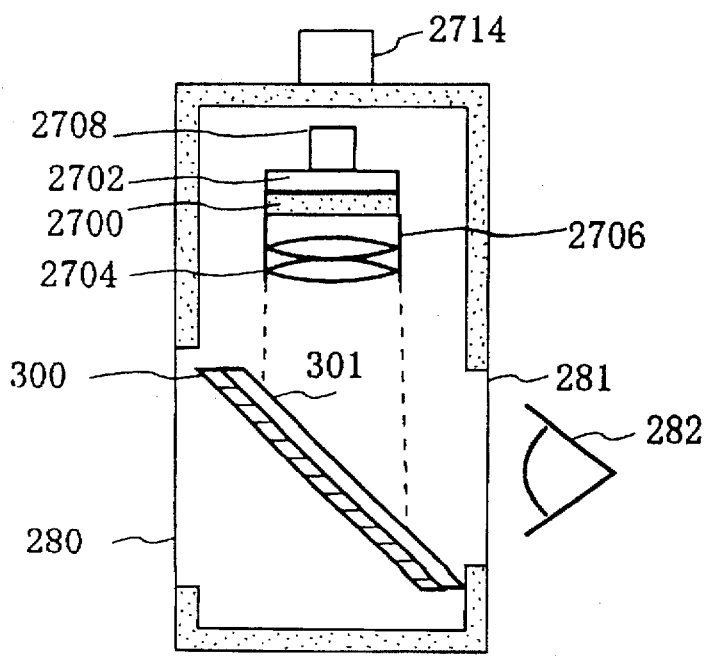
FIG. 30 is a cross-sectional view of the head-mounted display according to the ninth embodiment.

A ninth embodiment of the invention will be described below with reference to drawings. The external view of the head-mounted display of this embodiment is the same as that of the eighth embodiment shown in FIG. 27. A cross-sectional view of the head-mounted display is shown in FIG. 30, wherein components designated by the same reference numerals as those shown in FIG. 28 have the same functions. In the figure, 300 designates a light-blocking liquid-crystal panel which acts to block light entering through an external window 280; that is, in the ON state, outside light is blocked, and in the OFF state, outside light is transmitted through it. Reference numeral 301 is a transparent glass or acrylic panel.

Figure 31:
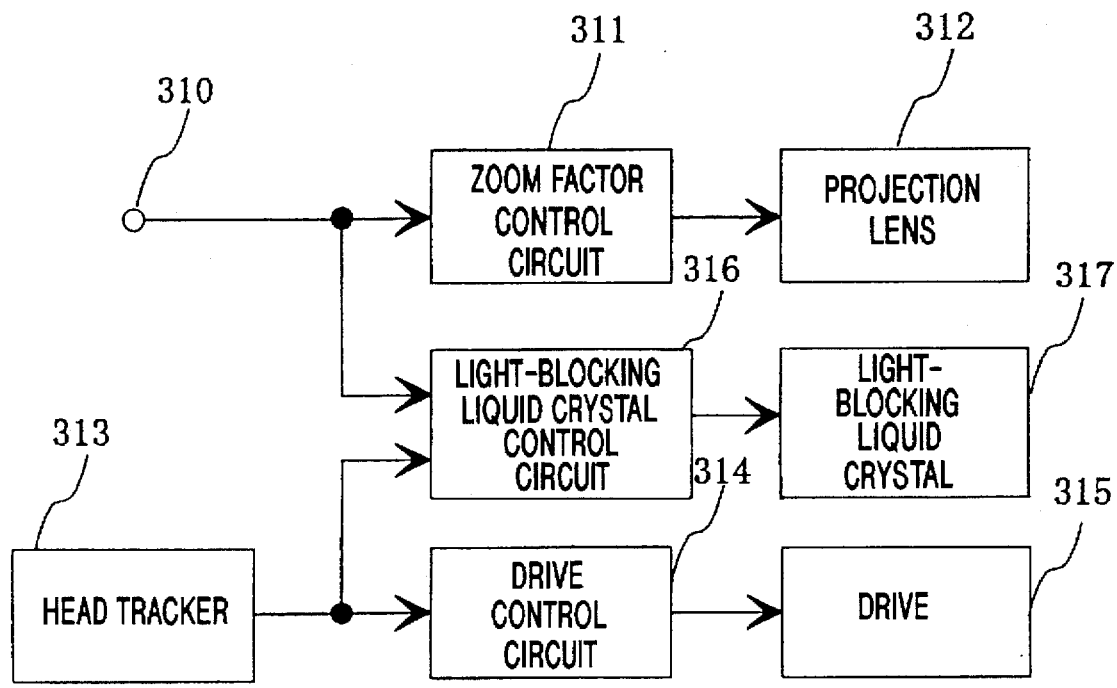
FIG. 31 is a block diagram showing the general configuration of a head-mounted display according to the ninth embodiment.

The operation of the thus constructed head-mounted display of the eighth embodiment will be described next. FIG. 31 is a block diagram for the head-mounted display of the ninth embodiment, wherein 310 designates a zoom adjusting terminal via which to input zoom information as a zoom factor to determine the amount of enlargement when projecting an image displayed on the liquid-crystal panel, 311 indicates a zoom factor control circuit for varying the zoom factor of the projection lens 2704 in accordance with the zoom information, 312 represents the projection lenses 2704 and 2705 shown in FIG. 27. Further, 313 designates a head tracker for detecting the position and orientation of a viewer's head, 314 indicates a drive control circuit for outputting a drive control signal in accordance with the output of the head tracker 313, and 315 represents the drives 2708 and 2709 shown in FIG. 27, for driving the projection units 2706 and 2707 in accordance with the drive control signal. Reference numeral 316 is a light-blocking liquid crystal control circuit for controlling the light-blocking liquid-crystal panel 300 in accordance with the zoom information and the output of the head tracker 313, and 317 is the light-blocking liquid-crystal panel indicated by 300 in FIG. 30.

When the zoom information for adjusting the zoom factor of the projection lens 2704 is input via the zoom adjusting terminal 310, the zoom factor control circuit 311 outputs a zoom control signal which is supplied to the projection lens 2704 so that the image displayed on the liquid-crystal panel 2700 is projected in the desired size.

Figures 32A, 32B:
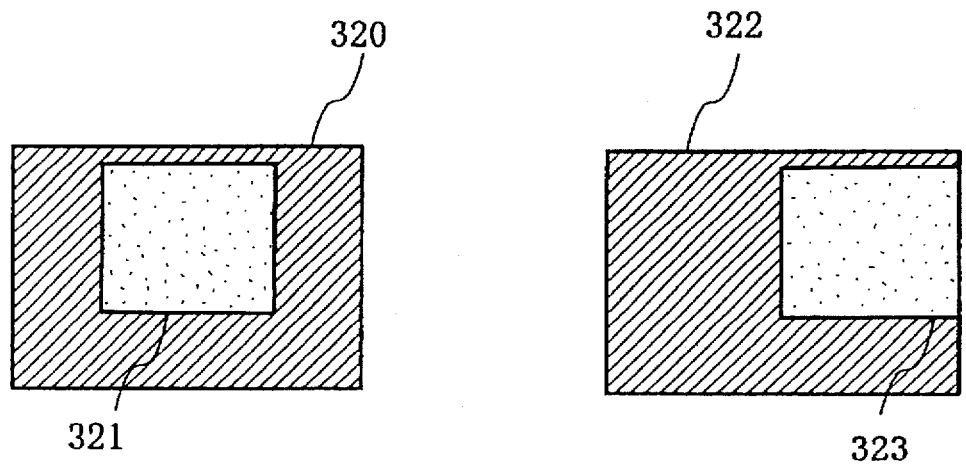
FIGS. 32(a) and 32(b) are diagrams for explaining the operation of the head-mounted display according to the ninth embodiment.

Next, when the viewer's head position and the direction of head rotation are detected and output from the head tracker 313, the drive control circuit 314 outputs a control signal to control the drive 2708. This will be described with reference to FIG. 32. FIG. 32(a) is a schematic diagram illustrating the condition when the viewer is viewing in the head-mounted display while facing in the straight ahead direction, wherein 320 is a reflective/transmissive panel constructed from the light-blocking liquid-crystal panel 300 and glass panel 301, and 321 is an image of the liquid-crystal panel 2700 projected through the projection lens 2704. FIG. 32(b) is a schematic diagram illustrating the condition when the viewer has rotated his head x degrees to the left relative to the straight ahead direction, wherein 322 is the reflective/transmissive panel constructed from the light-blocking liquid-crystal panel 300 and glass panel 301, and 323 is an image of the liquid-crystal panel 2700 projected through the projection lens 2704.

When the viewer is looking in straight ahead direction, that is, in the case of FIG. 32(a), the image displayed on the liquid-crystal panel 2700 is projected on the center area of the reflective/transmissive panel 320. Next, when the viewer's head is rotated x degrees to the left, the drive is controlled so that the projected image is moved x degrees to the right as viewed from the viewer, as shown in FIG. 32(b).

The output of the head tracker 313 and the input applied to the zoom adjusting terminal 310 are also supplied to the light-blocking liquid crystal control circuit 316, which outputs the signal to control the light-blocking liquid crystal panel 300. Control is performed so that the light-blocking liquid crystals are activated for the areas 321 and 323 where the image is projected on the reflective/transmissive panel 320, 322 in FIG. 32, and deactivated for other areas. As a result, outside light is blocked in the projected image areas 321 and 323 in FIG. 32, reflecting only the image displayed on the liquid-crystal panel toward the viewer, and in the other areas, outside light is transmitted through to the viewer.

In the present embodiment, the display position is determined based on the output of the head tracker, but if a configuration such as shown in FIG. 7 or 11 is incorporated, as described in detail in connection with the second and fourth embodiments, control can be performed while suppressing the minute shaking of the viewer's head. Furthermore, if a sensor is provided for detecting the viewer's line of sight, and a configuration such as shown in FIG. 3 or 9 is incorporated, as described in detail in connection with the first and third embodiments, control can be performed while suppressing the minute shaking of the viewer's head. The configuration shown in FIG. 13, described in detail in connection with the fifth embodiment, may also be incorporated.

Figure 33:
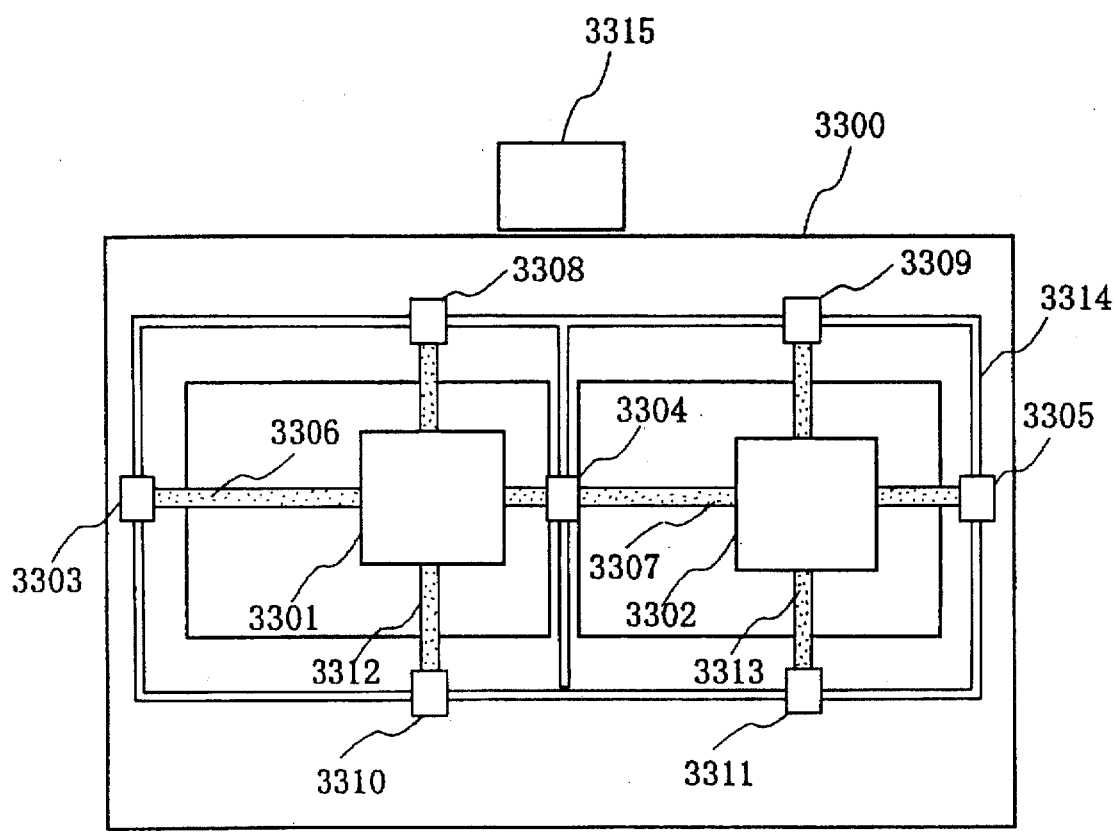
FIG. 33 is an external view of a head-mounted display according to 10th and 11th embodiments of the invention.

A 10th embodiment of the invention will be described below with reference to drawings. FIG. 33 is an external view of the head-mounted display according to the 10th embodiment of the invention. In FIG. 33, 3300 is the head-mounted display; 3301 and 3302 are left- and right-eye displays each constructed from a liquid-crystal panel; 3303 to 3305 are vertical moving motors for moving the displays 3301 and 3302 in vertical directions; 3306 and 3307 are supports for supporting the displays 3301 and 3302 whey they are moved in vertical directions; 3308 to 3311 are horizontal moving motors for moving the displays 3301 and 3302 in horizontal directions; 3312 and 3313 are supports for supporting the displays 3301 and 3302 when they are moved in horizontal directions; 3314 is a guide for guiding the vertical moving motors 3303 to 3305 and horizontal moving motors 3308 to 3311; and 3315 is a head tracker for detecting the position and orientation of a viewer's head.

Figure 34:
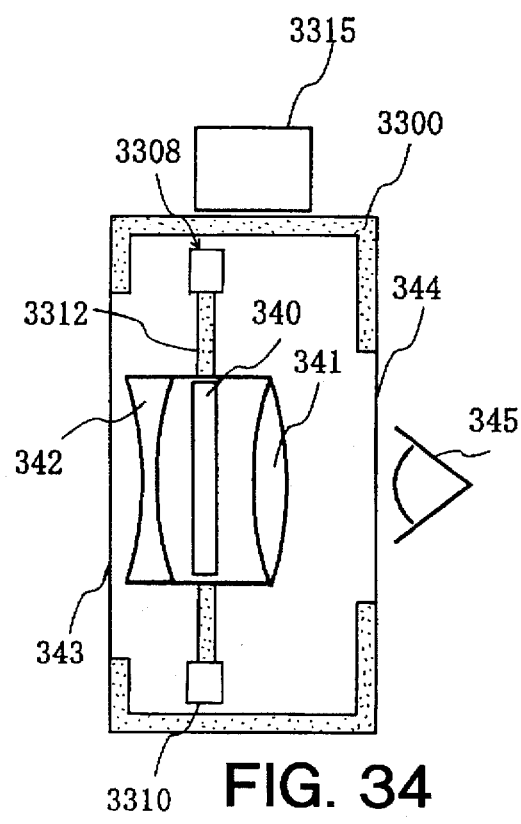
FIG. 34 is a cross-sectional view of the head-mounted display according to the 10th embodiment.

FIG. 34 is a cross-sectional view of the head-mounted display according to the 10th embodiment, wherein components designated by the same reference numerals as those shown in FIG. 33 have the same functions. In FIG. 34, 340 is a liquid-crystal panel, 341 is an eyepiece, 342 is a zoom adjusting lens, 343 is an external window for admitting outside light, 344 is a viewing window through which a viewer views, and 345 is an eye of the viewer.

The operation of the thus constructed head-mounted display of the 10th embodiment will be described next. When a video signal is input, a display is produced on the liquid-crystal panel 340. An image in the outside world entering through the external window 343 passes through the portions around the perimeter of the zoom adjusting lens 342 and reaches the eye of the viewer through the viewing window 344. On the other hand, the outside light transmitted through the zoom adjusting lens 342 also acts as a backlight for the liquid-crystal panel 340 and reaches the viewer's eye through the eyepiece 341 together with the image displayed on the liquid-crystal panel 340. Here, the magnification of the zoom adjusting lens 342 is the reciprocal of the magnification of the eyepiece 341; as a result, the outside image reaching the viewer's eye through the zoom adjusting lens 342 and eyepiece 341 is seen by the viewer in the same size as the outside image reaching the viewer's eye without passing through the zoom adjusting lens 342. That is, the viewer views the outside image overlaid on the image displayed on the liquid-crystal panel 340 and magnified through the eyepiece.

When the viewer is looking in the straight ahead direction, the horizontal and vertical moving motors are controlled in accordance with the output from the head tracker so that the displays 3301 and 3302 are positioned right in front of the viewer's eyes.

Next, when the viewer has rotated his head x degrees to the left, the head tracker 3315 outputs information signifying that the head has been rotated x degrees to the left, in accordance with which the horizontal moving motors 3308 to 3311 are controlled to move the displays 3301 and 3302 to positions corresponding to the x degrees rightward relative to the viewer. Likewise, when the viewer has rotated his head x degrees upward, the vertical moving motors 3303 to 3305 are driven to move the displays 3301 and 3302 to positions corresponding to the x degrees downward relative to the viewer. When the viewer has rotated his head rightward or downward, the displays are likewise moved leftward or upward. In this manner, control is performed so that the relative positional relationship between the outside world and the displays is retained. Also, the motors are controlled so that no variations occur in the relative positional relationship when the head position is moved in vertical or horizontal directions.

In the present embodiment, outside light has been used to backlight the liquid-crystal panel 340, but a line light source may be provided around the liquid-crystal panel to permit viewing of a displayed image in darkness.

Further, in the present embodiment, the display position is determined based on the output of the head tracker, but if a configuration such as shown in FIG. 7 or 11 is incorporated, as described in detail in connection with the second and fourth embodiments, control can be performed while suppressing the minute shaking of the viewer's head. Furthermore, if a sensor is provided for detecting the viewer's line of sight, and a configuration such as shown in FIG. 3 or 9 is incorporated, as described in detail in connection with the first and third embodiments, control can be performed while suppressing the minute shaking of the viewer's head.

Figure 35:
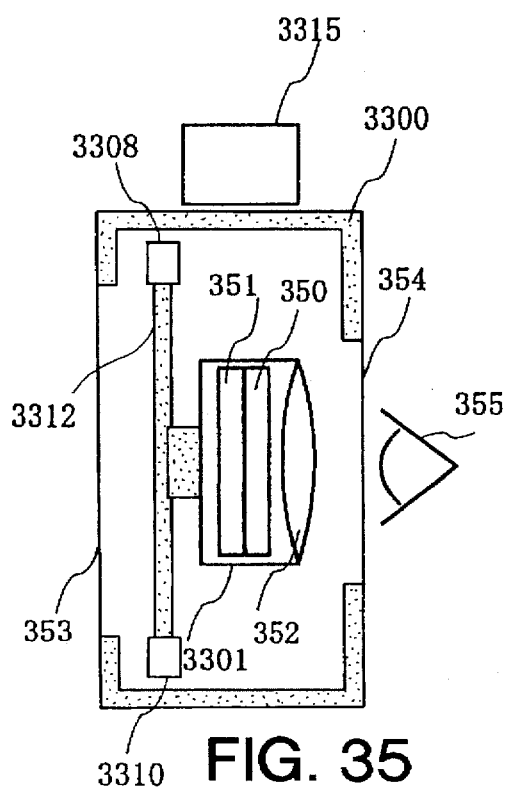
FIG. 35 is a cross-sectional view of the head-mounted display according to the 10th embodiment.

An 11th embodiment of the invention will be described with reference to drawings. The external view of the head-mounted display of this embodiment, as viewed from the front, is the same as that shown in FIG. 33. A cross-sectional view of the construction is shown in FIG. 35. In FIG. 35, components designated by the same reference numerals as those shown in FIG. 33 have the same functions. In FIG. 35, 350 is a liquid-crystal panel for displaying an input image, 351 is a backlight for the liquid-crystal panel 350, 352 is an eyepiece, 353 is an external window for admitting outside light, 354 is a viewing window through which the viewer views, and 355 is an eye of the viewer.

The operation of the thus constructed head-mounted display of the 11th embodiment will be described next. When a video signal is input, an image is displayed on the liquid-crystal panel 350, and with backlighting from the backlight 351, the image reaches the viewer's eye through the eyepiece. On the other hand, outside light entering through the external window 353 is blocked by the backlight 351 but is passed through the portions around its periphery and reaches the viewer's eye through the viewing window 354. The viewer views the outside image simultaneously with the image displayed on the liquid-crystal panel 350 and magnified through the eyepiece.

The liquid-crystal panel 350, the backlight 351, and the eyepiece 352 are moved as a single unit in vertical and horizontal directions. The control operation to accomplish this is the same as that described in connection with the 10th embodiment.

While the above embodiment has been described using a liquid-crystal panel as the display, it will be appreciated that the embodiment can be carried out using a CRT or other type of display device.

Furthermore, the display position is determined based on the output of the head tracker, but if a configuration such as shown in FIG. 7 or 11 is incorporated, as described in detail in connection with the second and fourth embodiments, control can be performed while suppressing the minute shaking of the viewer's head. Furthermore, if a sensor is provided for detecting the viewer's line of sight, and a configuration such as shown in FIG. 3 or 9 is incorporated, as described in detail in connection with the first and third embodiments, control can be performed while suppressing the minute shaking of the viewer's head. The configuration shown in FIG. 13, described in detail in connection with the fifth embodiment, may also be incorporated.

What is claimed is:

1. A head-mounted display for displaying an image on a display while controlling a viewing angle of the image and a moving speed of an entire image on the basis of a viewer's head position, head orientation, and line-of-sight direction, comprising:

head detecting means for detecting the viewer's head position and head orientation, and for outputting the result of the detection as a head information signal;

line-of-sight detecting means for detecting the viewer's line-of-sight direction, and for outputting the result of the detection as a line-of-sight information signal;

adaptive filtering means for filtering head jitter from said head information signal based on said head information signal and said line-of-sight information signal; and image generating means for generating an image by using said filtered head information signal and said line-of-sight information signal.

2. A head-mounted display for displaying an image on a display while controlling a viewing angle of the image and a moving speed of an entire image on the basis of a viewer's head position, head orientation, and line-of-sight direction, comprising:

head detecting means for detecting the viewer's head position and head orientation, and for outputting the result of the detection as a first head information signal;

line-of-sight detecting means for detecting the viewer's line-of-sight direction, and for outputting the result of the detection as a line-of-sight information signal;

filter control means for calculating an amount of head movement and an amount of line-of-sight movement from a first head information signal output from said head detecting means and the line-of-sight information signal output from said line-of-sight detecting means, and for generating from said amount of head movement and said amount of line-of-sight movement a filter control signal for controlling a pass band;

variable filter means, whose filter characteristic is controlled by said filter control signal, for outputting the result of the control as a second head information; and image generating means for generating an image by using the second head information signal output from said variable filter means and the line-of-sight information signal output from said line-of-sight detecting means.

3. A head-mounted display according to claim 2, wherein said variable filter means includes delay means consisting of at least n (n≧1) delay circuits each for delaying the first head information signal, output from said head detecting means, by a unit time, multiplying means consisting of n+1 multipliers, for which an n-tuple filter coefficient is determined by the filter control signal output from said filter control means, and which multiplies an input to said delay means and an output of each of said delay circuits by said filter coefficient, adding means for adding together values output from said n+1 multipliers and thereby outputting a translated head information signal, and head signal combining means for combining the translated head information signal output from said adding means with the first head information signal output from said head detecting means, and thereby generating the second head information signal.

4. A head-mounted display according to claim 2 or 3, wherein said filter control means includes first calculating means for calculating an amount of head rotation from the first head information signal output from said head detecting means, and supplies said variable filter means with the filter control signal for determining the filter coefficient such that when said line-of-sight direction coincides with the direction of head rotation, a low-pass characteristic is provided, with a cut-off frequency being made lower when the amount of head rotation calculated by said first calculating means is small than when it is large, and when said line-of-sight direction is different from the direction of head rotation, a low-pass characteristic is provided.

5. A head-mounted display for displaying an image on a display while controlling a viewing angle of the image and a moving speed of an entire image on the basis of a viewer's head position, head orientation, and line-of-sight direction, comprising:

head detecting means for detecting the viewer's head position and head orientation, and for outputting the result of the detection as a first head information signal;

filter control means for calculating at least a first derivative of the head position or head orientation with respect to unit time from the first head information signal output from said head detecting means, and for generating a filter control signal to provide a low-pass characteristic when said first derivative is smaller than a prescribed value and an all-pass characteristic when said first derivative is not smaller than the prescribed value;

variable filter means, whose filter characteristic is controlled by said filter control signal, for outputting a second head information signal; and image generating means for generating an image by using the second head information signal output from said variable filter means.

6. A head-mounted display according to claim 5, wherein said variable filter means includes delay means consisting of at least n ($n \geq 1$) delay circuits each for delaying the first head information signal, output from said head detecting means, by a unit time, multiplying means consisting of n+1 multipliers, for which an n+1 tuple filter coefficient is determined by the filter control signal output from said filter control means, and which multiplies an input to said delay means and an output of each of said delay circuits by said filter coefficient, adding means for adding together values output from said n+1 multipliers and thereby outputting a translated head information signal, and head signal combining means for combining the translated head information signal output from said adding means with the first head information signal output from said head detecting means, and thereby generating the second head information signal.

7. A head-mounted display according to claim 5 or 6, wherein said filter control means further calculates a second derivative of the head position or head orientation with respect to unit time, and said filter control means includes a first subtractor for subtracting an output signal of a first delay circuit, an element of said delay means, from an input signal thereof;

a second subtractor for subtracting an output signal of a second delay circuit, an element of said delay means, from an input signal thereof;

a third subtractor for subtracting an output of said second subtractor from an output of said first subtractor, and filter coefficient control means for accepting the output of said first subtractor as the first derivative of the head position or head orientation with respect to unit time and an output of said third subtractor as the second derivative of the head position or head orientation with respect to unit time, and for generating a filter coefficient control signal, and supplies said variable filter means with the filter control signal for determining the filter coefficient such that when said first derivative and said second derivative of the head position or head orientation are both equal to or greater than the prescribed value, a low-pass characteristic is provided, and when said first derivative and said second derivative of the head position or head orientation are both smaller than the prescribed value, an all-pass characteristic is provided.

8. A head-mounted display for displaying an image on a display while controlling a viewing angle of the image and a moving speed of an entire image on the basis of a viewer's head position, head orientation, and line-of-sight direction, comprising:

head detecting means for detecting the viewer's head position and head orientation, and for outputting the result of the detection as a first head information signal;

line-of-sight detecting means for detecting the viewer's line-of-sight direction, and for outputting the result of the detection as a line-of-sight information signal;

threshold output means for accepting at an input thereof the line-of-sight information signal output from said line-of-sight detecting means, and for outputting a small threshold when an amount of line-of-sight movement is equal to or greater than a prescribed value and a large threshold when said amount is smaller than the prescribed value;

second head information generating means for judging whether to proceed to generate an image or stop the image, by comparing the threshold output from said threshold output means with said first head information signal, and for outputting the result of the judgement as a second head information signal; and image generating means for generating an image by using said second head information signal and the line-of-sight information signal output from said line-of-sight detecting means.

9. A head-mounted display for displaying an image on a display while controlling a viewing angle of the image and a moving speed of an entire image on the basis of a viewer's head position, head orientation, and line-of-sight direction, comprising:

head detecting means for detecting the viewer's head position and head orientation, and for outputting the result of the detection as a first head information signal;

threshold output means for accepting at an input thereof the output of said head detecting means, and for outputting a small threshold when at least a head moving speed or head rotation speed is equal to or greater than a prescribed value and a large threshold when said speed is smaller than the prescribed value;

second head information generating means for judging whether to proceed to generate an image or stop the image, by comparing the threshold output from said threshold output means with said first head information signal, and for outputting the result of the judgement as a second head information signal; and image generating means for generating an image by using said second head information signal.

10. A head-mounted display according to claim 9, wherein said threshold output means calculates from said head information signal a head moving speed or head rotation speed at unit time and a head moving acceleration or head rotation acceleration at unit time, and outputs said threshold.

11. A head-mounted display for displaying an image on a display while controlling a viewing angle of the image and a moving speed of an entire image on the basis of a viewer's head position, head orientation, and line-of-sight direction, comprising:

head detecting means for detecting the viewer's head position and head orientation, and for outputting the result of the detection as a first head information signal;

line-of-sight detecting means for detecting the viewer's line-of-sight direction, and for outputting the result of the detection as a line-of-sight information signal;

moving amount control means for accepting said first head information signal and said line-of-sight information signal, and for outputting a moving amount control signal;

moving amount translating means for translating said first head information signal in accordance with said moving amount control signal, and for outputting a second head information signal; and image generating means for generating an image on the basis of said second head information signal.

12. A head-mounted display for displaying an image on a display while controlling a viewing angle of the image and a moving speed of an entire image on the basis of a viewer's head position, head orientation, and line-of-sight direction, comprising:

head detecting means for detecting the viewer's head position and head orientation, and for outputting the result of the detection as a first head information signal;

line-of-sight detecting means for detecting the viewer's line-of-sight direction, and for outputting the result of the detection as a line-of-sight information signal;

moving amount control means for accepting said first head information signal and said line-of-sight information signal, and for outputting a moving amount control signal;

moving amount translating means for translating said first head information signal in accordance with said moving amount control signal, and for outputting a second head information signal;

error compensating means for accepting said first head information signal, said second head information signal, and said moving amount control signal, errors between said second head information signal and said first head information signal being accumulated as error signals, and for generating an error compensating signal based on accumulated values of said error signals; and image generating means for generating an image by reference to said line-of-sight information signal such that, when the line of sight is not fixed and when the head is moving, the image is generated by adding said error compensating signal to said second head information signal, and when the line of sight is fixed or when the head is not moving, the image is generated without performing the addition but by using said second head information signal.

13. A head-mounted display according to claim 11 or 12, wherein said moving amount control means has the viewer's stationary-state eyeball motion prestored therein, measures the eyeball motion from said line-of-sight information signal, calculates a difference between the thus measured eyeball motion and the stationary-state eyeball motion, and outputs a moving amount control signal that matches the difference.

14. A head-mounted display according to claim 11 or 12, wherein said moving amount control means compares a line-of-sight rotation angle contained in said line-of-sight information signal with a head rotation angle contained in said first head information signal, and when rotation directions are opposite to each other, outputs a moving amount control signal for said moving amount translating means to suppress the head rotation angle contained in said first head information signal.

15. A see-through type head-mounted display for viewing outside light and a displayed image in overlaid fashion with a position of the displayed image being changed to match head movement, comprising:

video signal input means for inputting a video signal;

magnification control means for outputting a display magnification signal for controlling an image display magnification;

a head detection sensor for detecting a viewer's head position and head orientation, and for outputting the same as a first head information signal;

image control means for controlling the image display magnification and image display position on the basis of said first head information signal and said display magnification signal;

display means for displaying an image output from said image control means;

a projection lens for projecting the image of said display means in a designated size; and a mirror having prescribed transmissivity such that the image projected by said projection lens is reflected into the viewer's field of view, while, at the same time, allowing the outside light to enter the viewer's eyes.

16. A head-mounted display according to claim 15, wherein said display means includes a liquid-crystal panel and a backlight whose illuminating area varies in accordance with an output signal of said image control means.

17. A head-mounted display according to claim 15, further comprising line-of-sight detecting means for detecting the viewer's line-of-sight direction, and for outputting the result of the detection as a line-of-sight information signal, filter control means for calculating the viewer's viewpoint position on said mirror from said first head information signal and said line-of-sight information signal, and for generating a filter control signal for performing a prescribed band pass control when the viewer is viewing the image projected on said mirror by said projection lens, and a filter control signal that provides an all-pass characteristic when the viewer is viewing a portion other than the image projected on said mirror by said projection lens, and variable filter means, whose filter characteristic is controlled by said filter control signal, for outputting a second head information signal, wherein said image control means controls the image display magnification and image display position on the basis of said second head information signal and said display magnification signal.

18. A head-mounted display according to claim 17, wherein said display means includes a liquid-crystal panel and a backlight whose illuminating area varies in accordance with an output signal of said image control means.

19. A see-through type head-mounted display in which a displayed image position is changed to match head movement, comprising:

video signal input means for inputting a video signal;

magnification control means for outputting a display magnification signal for controlling an image display magnification;

a head detection sensor for detecting a viewer's head position and head orientation, and for outputting the same as a first head information signal;

line-of-sight detecting means for detecting the viewer's line-of-sight direction, and for outputting the result of the detection as a line-of-sight information signal;

image control means for calculating the image display magnification and image display position on the basis of said first head information signal and said display magnification signal, and for outputting the same as an image control signal;

display means for displaying the input image in accordance with said image control signal;

a projection lens for projecting the image of said display means in a designated size; and a reflective/transmissive panel constructed from a transparent panel and a liquid-crystal panel attached back-to-back, said liquid-crystal panel being driven in accordance with said image control signal.

20. A head-mounted display according to claim 19, wherein said display means includes a liquid-crystal panel and a backlight whose illuminating area varies in accordance with an output signal of said image control means.

21. A head-mounted display according to claim 19, further comprising filter control means for calculating the viewer's viewpoint position on said reflective/transmissive panel from said first head information signal and said line-of-sight information signal, and for generating a filter control signal for performing a prescribed band pass control when the viewer is viewing the image projected on said reflective/transmissive panel by said projection lens, and a filter control signal that provides an all-pass characteristic when the viewer is viewing a portion other than the image projected on said reflective/transmissive panel by said projection lens, and variable filter means, whose filter characteristic is controlled by said filter control signal, for outputting a second head information signal, wherein said image control means controls the image display magnification and image display position on the basis of said second head information signal, instead of said first head information signal, and said display magnification signal.

22. A head-mounted display according to claim 21, wherein said display means includes a liquid-crystal panel and a backlight whose illuminating area varies in accordance with an output signal of said image control means.

23. A see-through type head-mounted display for viewing outside light and a displayed image in overlaid fashion with a position of the displayed image being changed to match head movement, comprising:

video signal input means for inputting a video signal;

magnification control means for outputting a display magnification signal for controlling an image display magnification;

display means for displaying the input video signal;

a head detection sensor for detecting a viewer's head position and head orientation, and for outputting the same as a first head information signal;

a projection lens for projecting the image displayed on said display means by enlarging the image in accordance with said display magnification signal;

driving means for driving said display means and said projection lens, integrally constructed, in accordance with said first head information signal, and thereby controlling the direction of image projection; and a mirror having prescribed transmissivity such that the image projected by said projection lens is reflected into the viewer's field of view, while, at the same time, allowing the outside light to enter the viewer's eyes.

24. A head-mounted display according to claim 23, further comprising line-of-sight detecting means for detecting the viewer's line-of-sight direction, and for outputting the result of the detection as a line-of-sight information signal, filter control means for calculating the viewer's viewpoint position on said mirror from said first head information signal and said line-of-sight information signal, and for generating a filter control signal for performing a prescribed band pass control when the viewer is viewing the image projected on said mirror by said projection lens, and a filter control signal that provides an all-pass characteristic when the viewer is viewing a portion other than the image projected on said mirror by said projection lens, and variable filter means, whose filter characteristic is controlled by said filter control signal, for outputting a second head information signal, wherein said driving means controls the image display magnification and image display position on the basis of said second head information signal.

25. A see-through type head-mounted display in which a displayed image position is changed to match head movement, comprising:

video signal input means for inputting a video signal;

magnification control means for outputting a display magnification signal for controlling an image display magnification;

display means for displaying the input video signal;

a head detection sensor for detecting a viewer's head position and head orientation, and for outputting the same as a first head information signal;

a projection lens for projecting the image displayed on said display means by enlarging the image in accordance with said display magnification signal;

driving means for driving said display means and said projection lens as an integral unit in accordance with said first head information signal, and thereby controlling the direction of image projection; and a reflective/transmissive panel constructed from a transparent panel and a liquid-crystal panel attached back-to-back, said liquid-crystal panel being driven in accordance with said image control signal.

26. A head-mounted display according to claim 25, further comprising line-of-sight detecting means for detecting the viewer's line-of-sight direction, and for outputting the result of the detection as a line-of-sight information signal, filter control means for calculating the viewer's viewpoint position on said reflective/transmissive panel from said first head information signal and said line-of-sight information signal, and for generating a filter control signal for performing a prescribed band pass control when the viewer is viewing the image projected on said reflective/transmissive panel by said projection lens, and a filter control signal that provides an all-pass characteristic when the viewer is viewing a portion other than the image projected on said reflective/transmissive panel by said projection lens, and variable filter means, whose filter characteristic is controlled by said filter control signal, for outputting a second head information signal, wherein said driving means controls the image display magnification and image display position on the basis of said second head information signal.

27. A see-through type head-mounted display for viewing outside light and a displayed image in overlaid fashion with a position of the displayed image being changed to match head movement, comprising:

video signal input means for inputting a video signal;

a liquid-crystal panel for displaying an input image;

an eyepiece, interposed between said liquid-crystal panel and a viewer, for bringing the image of said liquid-crystal panel into focus within a clear vision range of the viewer;

a magnification adjusting lens positioned behind said liquid-crystal panel, as viewed from the viewer, and whose magnification is the reciprocal of that of the eyepiece;

a head detection sensor for detecting the viewer's head position and head orientation, and for outputting the same as a first head information signal; and driving means for moving said liquid-crystal panel, said eyepiece, and said magnification adjusting lens as an integral unit in vertical and horizontal directions in accordance with said first head information signal, and thereby controlling the same to a desired position.

28. A head-mounted display according to claim 27, further comprising line-of-sight detecting means for detecting the viewer's line-of-sight direction, and for outputting the result of the detection as a line-of-sight information signal, filter control means for calculating the viewer's viewpoint position from said first head information signal and said line-of-sight information signal, and for generating a filter control signal for performing a prescribed band pass control when the viewer is viewing the image displayed on said liquid-crystal panel, and a filter control signal that provides an all-pass characteristic when the viewer is viewing a portion other than the image displayed on said liquid-crystal panel, and variable filter means, whose filter characteristic is controlled by said filter control signal, for outputting a second head information signal, wherein said driving means controls the image display magnification and image display position on the basis of said second head information signal.

29. A see-through type head-mounted display in which a displayed image position is changed to match head movement, comprising:

video signal input means for inputting a video signal;

display means for displaying an input image signal;

an eyepiece, interposed between said display means and a viewer, for bringing the image of said display means into focus within a clear vision range of the viewer;

a head detection sensor for detecting the viewer's head position and head orientation, and for outputting the same as a first head information signal; and driving means for moving said display means and said eyepiece as an integral unit in vertical and horizontal directions in accordance with said first head information signal, and thereby controlling the same to a desired position.

30. A head-mounted display according to claim 29, further comprising line-of-sight detecting means for detecting the viewer's line-of-sight direction, and for outputting the result of the detection as a line-of-sight information signal, filter control means for calculating the viewer's viewpoint position from said first head information signal and said line-of-sight information signal, and for generating a filter control signal for performing a prescribed band pass control when the viewer is viewing the image displayed on said display means, and a filter control signal that provides an all-pass characteristic when the viewer is viewing a portion other than the image displayed on said display means, and variable filter means, whose filter characteristic is controlled by said filter control signal, for outputting a second head information signal, wherein said driving means controls the image display magnification and image display position on the basis of said second head information signal.

31. A head-mounted display according to claim 1 wherein said adaptive filtering means includes means for filtering said head information signal based on a rate of change of the viewer's head position and a rate of change the viewer's line-of-sight direction.

* * * * *

UNITED STATES PATENT AND TRADE MARK OFFICE
CERTIFICATE OF CORRECTION

PATENT NO.   : 5,742,264
DATED        : April 21, 1998
INVENTOR(S)  : Inagaki et al.

It is certified that error appears in the above-identified patent and that said Letters Patent is hereby corrected as shown below:

Cover page, item [56] References Cited, U.S. PATENT DOCUMENTS, add the following: --4,984,179  1/1991  Waldern--.

Cover page, item [57] ABSTRACT, line 7, delete "and when tracker,".

Cover page, item [57] Abstract, line 9, delete "this and".

Signed and Sealed this

Twentieth Day of October, 1998

Attest:

BRUCE LEHMAN

Attesting Officer                Commissioner of Patents and Trademarks